US012632840B2

(12) United States Patent
Saito et al.

(10) Patent No.: US 12,632,840 B2
(45) Date of Patent: May 19, 2026

(54) ELECTRONIC CURRENCY SYSTEM, INFORMATION PROCESSING APPARATUS, ELECTRONIC CURRENCY ISSUING METHOD AND PROGRAM

(71) Applicant: NTT, Inc., Tokyo (JP)

(72) Inventors: Tsunekazu Saito, Tokyo (JP); Fumitaka Hoshino, Tokyo (JP); Masayuki Abe, Tokyo (JP)

(73) Assignee: NTT, Inc., Tokyo (JP)

( * ) Notice: Subject to any disclaimer, the term of this patent is extended or adjusted under 35 U.S.C. 154(b) by 89 days.

(21) Appl. No.: 18/556,186

(22) PCT Filed: Jun. 2, 2021

(86) PCT No.: PCT/JP2021/021054
§ 371 (c)(1),
(2) Date: Oct. 19, 2023

(87) PCT Pub. No.: WO2022/254624
PCT Pub. Date: Dec. 8, 2022

(65) Prior Publication Data
US 2024/0211900 A1    Jun. 27, 2024

(51) Int. Cl.
G06Q 20/06 (2012.01)
G06Q 20/38 (2012.01)
G06Q 20/40 (2012.01)

(52) U.S. Cl.
CPC ..... G06Q 20/065 (2013.01); G06Q 20/38215 (2013.01); G06Q 20/3825 (2013.01);
(Continued)

(58) Field of Classification Search
CPC ........... G06Q 20/065; G06Q 20/38215; G06Q 20/3825; G06Q 20/3827; G06Q 20/401;
(Continued)

(56) References Cited

U.S. PATENT DOCUMENTS

2019/0108517 A1*    4/2019    Rose ................ G06Q 20/38215
2021/0233070 A1*    7/2021    Malene ................ G06Q 20/223

FOREIGN PATENT DOCUMENTS

JP        2000-259748        9/2000
JP        2002-073972        3/2002
(Continued)

OTHER PUBLICATIONS

"Ethereum for Secure Authentication of IoT using Pre-shared Keys (PSKs)", Mohammad El-Hajj, 2019 International Conference on Wireless Networks and Mobile Communications, Nov. 1, 2019 (Year: 2019).*
(Continued)

*Primary Examiner* — Duan Zhang
(74) *Attorney, Agent, or Firm* — IPUSA, PLLC

(57)            ABSTRACT

An electronic currency system including an issue bank server and a financial institution server, wherein the issue bank server includes a currency issue certificate issue unit that generates a currency issue certificate and transmits the generated currency issue certificate to the financial institution server, and a currency issue unit that adds a signature to a currency issue message in a predetermined electronic currency unit and transmits the currency issue message to the financial institution server, and the financial institution server includes a currency issue certificate issue reception unit that receives issue of the currency issue certificate from the issue bank server, and a currency issue reception unit that receives the currency issue message from the issue bank server, verifies the signature of the received currency issue message based on the currency issue certificate, and storing the issued currency in an unused currency storage unit.

12 Claims, 20 Drawing Sheets

1

(52) U.S. Cl.
CPC ....... *G06Q 20/3827* (2013.01); *G06Q 20/401* (2013.01); *G06Q 2220/00* (2013.01)

(58) Field of Classification Search
CPC .. G06Q 2220/00; G06Q 20/02; G06Q 20/108; G06Q 20/223; G06Q 40/02; H04L 9/3247; H04L 9/3263; H04L 9/50
See application file for complete search history.

(56) References Cited

FOREIGN PATENT DOCUMENTS

JP          2007-310562        11/2007
WO        WO-2017006136  A1  *   1/2017    ......... G06Q 20/0658

OTHER PUBLICATIONS

Arvind Narayanan et al., "Virtual currency textbooks", Nikkei Business Publications, Dec. 9, 2016, pp. 60-61, pp. 178-182, ISEN:978-4-8222-8454-6, pp. 60-61, section, 1.2.2 Merkle tree, pp. 178-182, section, 4.4.6 Proof of Liabilities.

Kazuo Ohta et al., "Electronic cash system", NTT R&D, vol. 44, No. 10, pp. 931 to 938, 1995.

Tatsuaki Okamoto et al., "One system of ideal electronic cash system", IEICE Transaction of Fundamentals of Electronics, Communications and Computer Science, Jun. 1993.

Jakobsson M. et al., "Fractal Merkle Tree Representation and Traversal", In: Joye M. (eds) Topics in Cryptology—CT—RSA 2003. CT-RSA 2003. Lecture Notes in Computer Science, vol. 2612. Springer, Berlin, Heidelberg, 2003.

* cited by examiner

[Fig. 1]
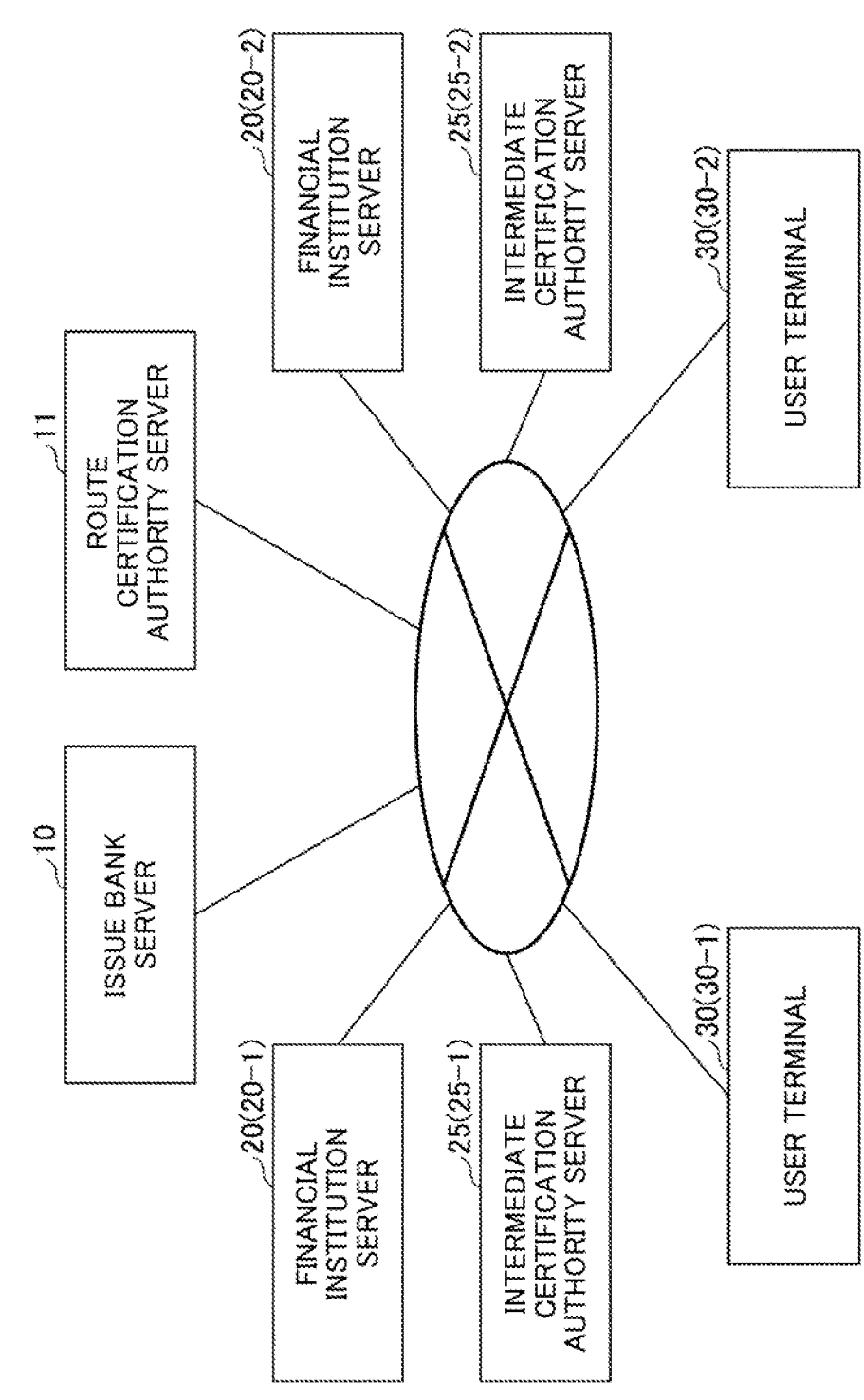

[Fig. 2]
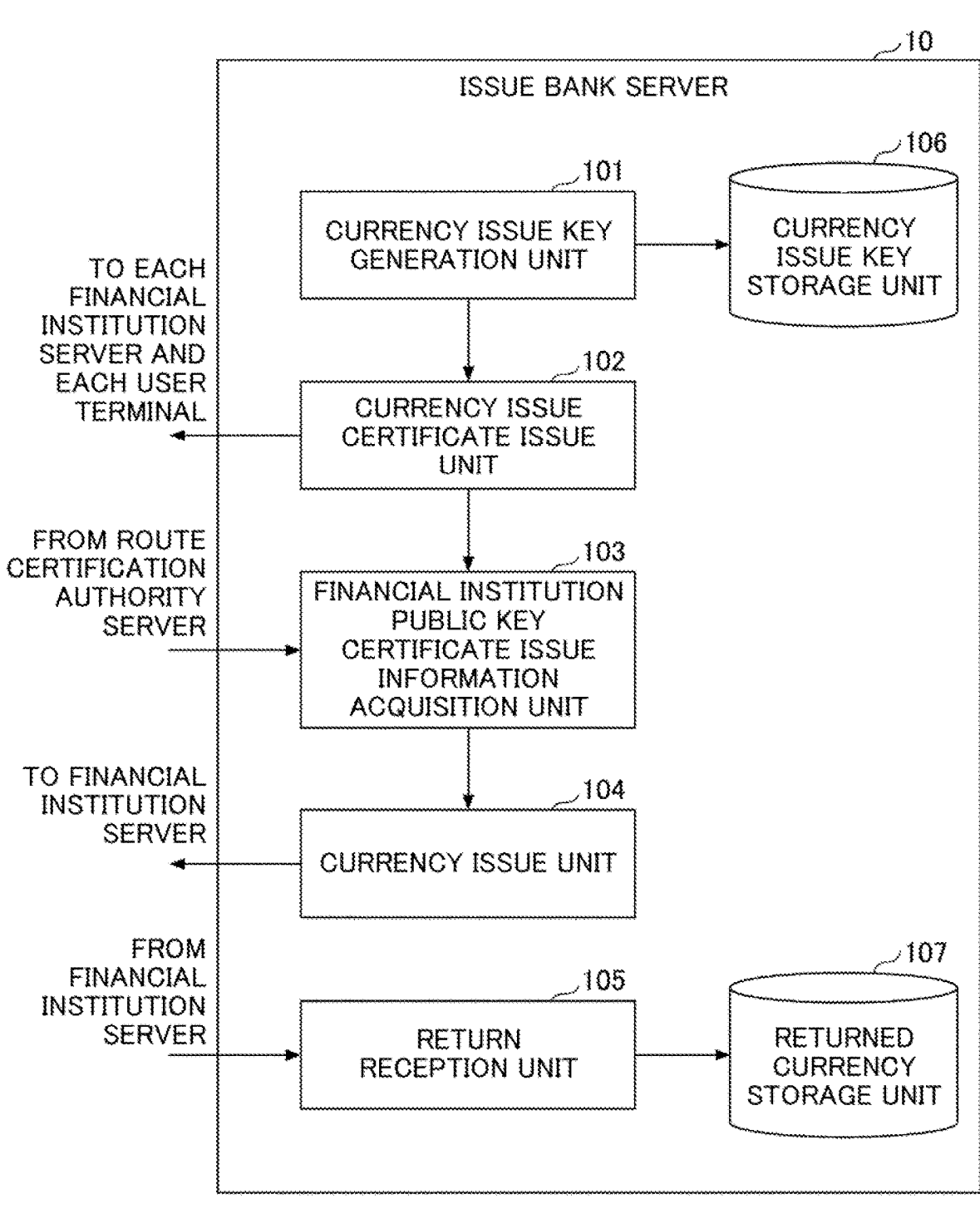

[Fig. 3]
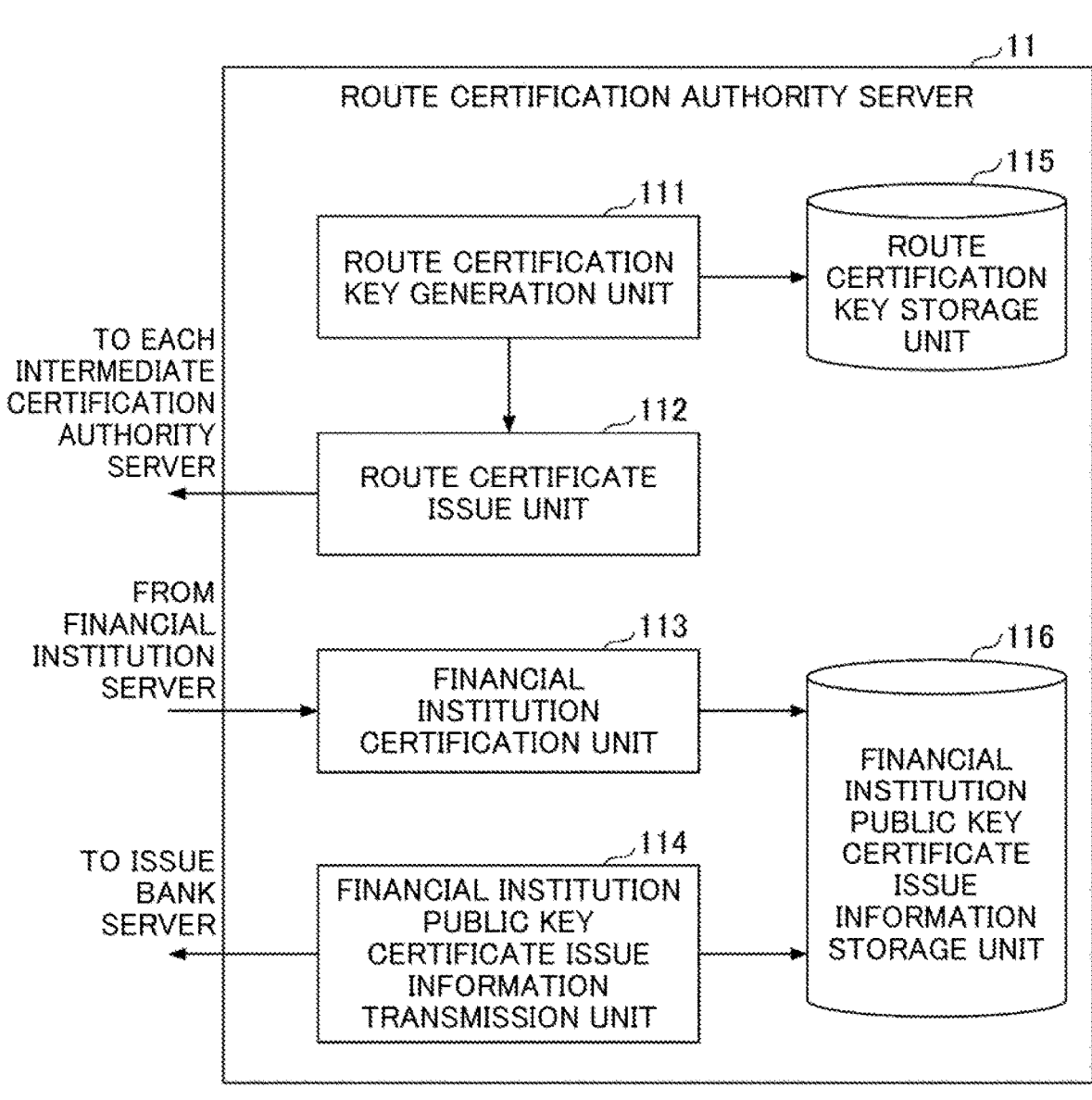

[Fig. 4]
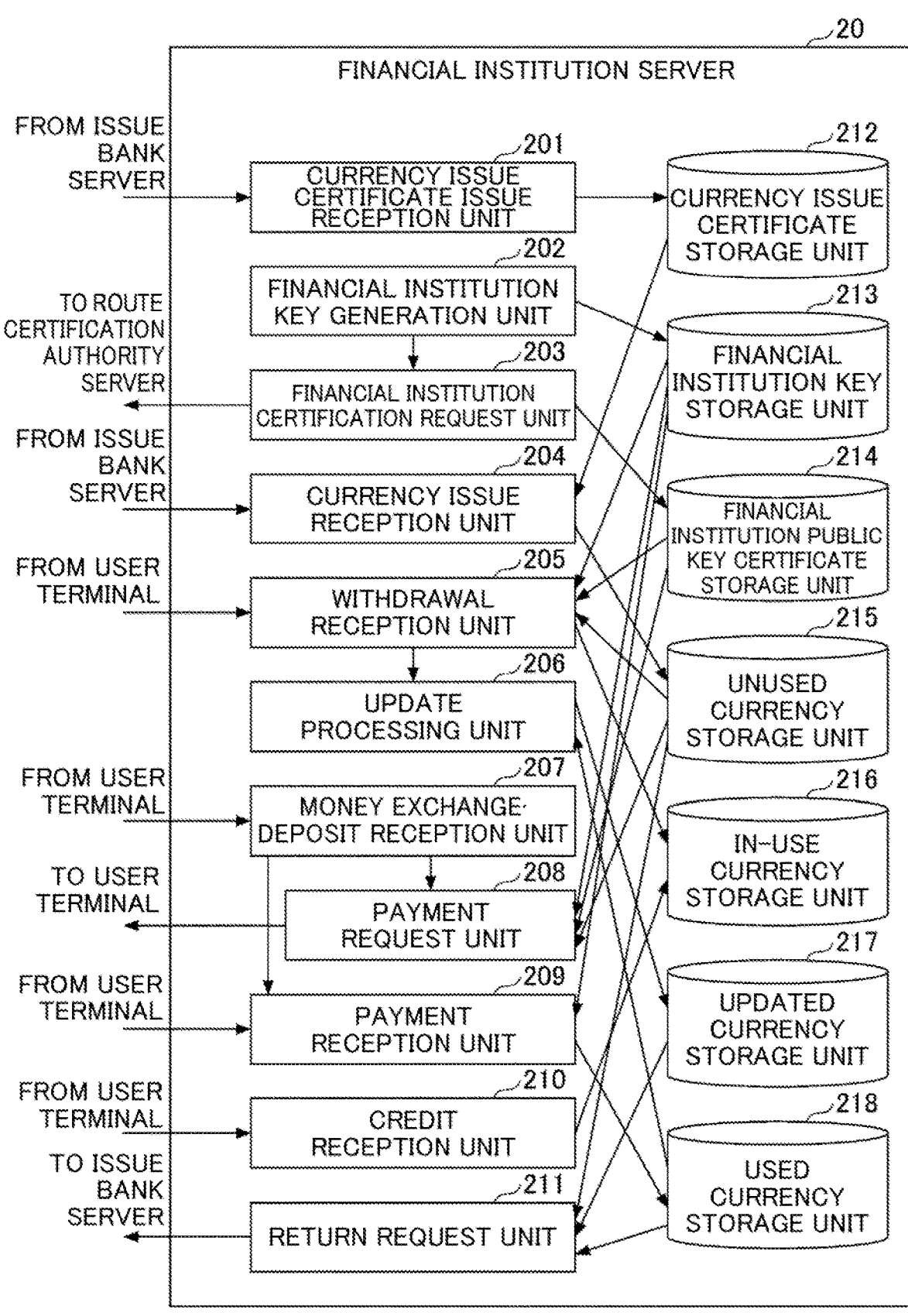

[Fig. 5]
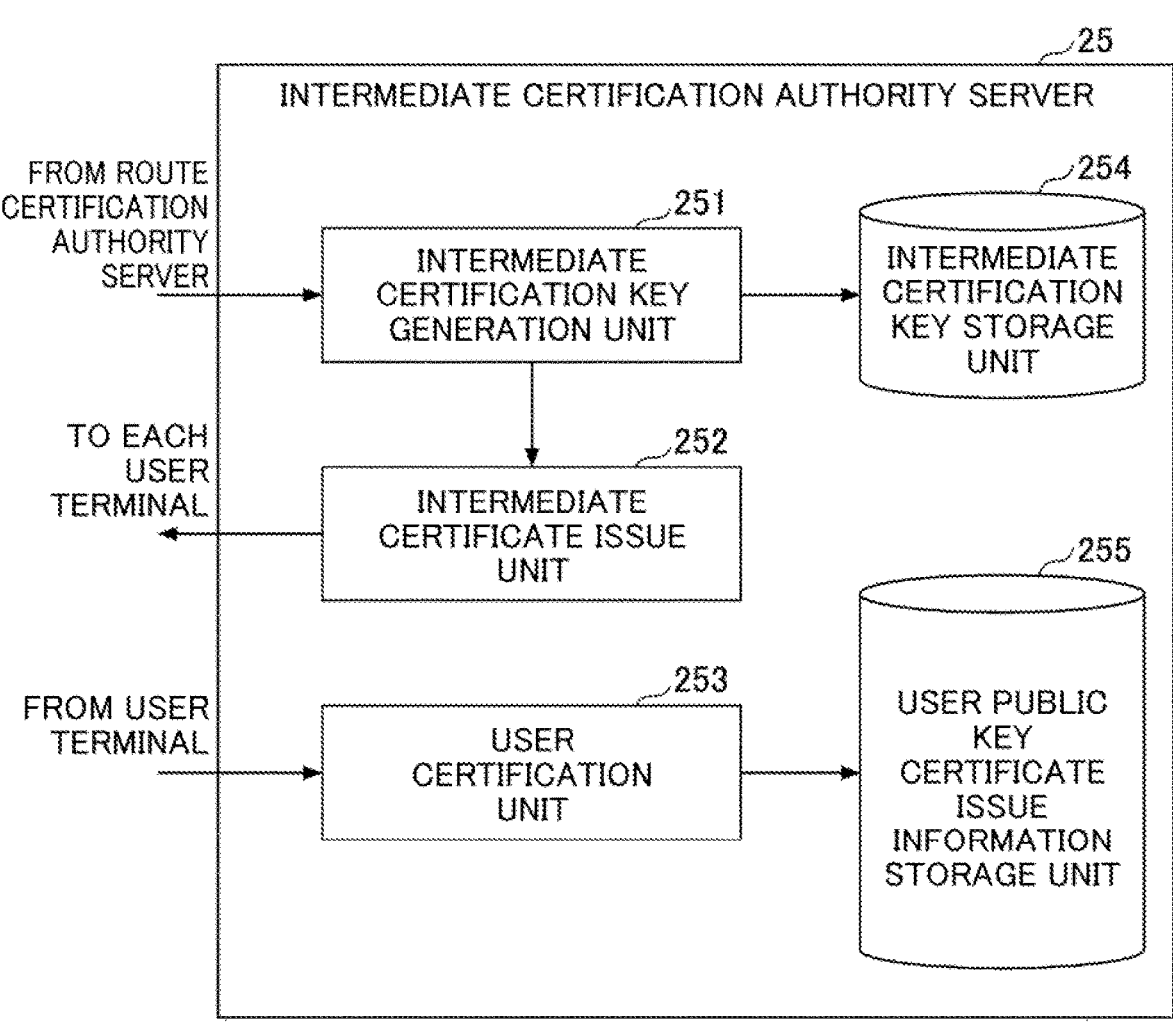

[Fig. 6]
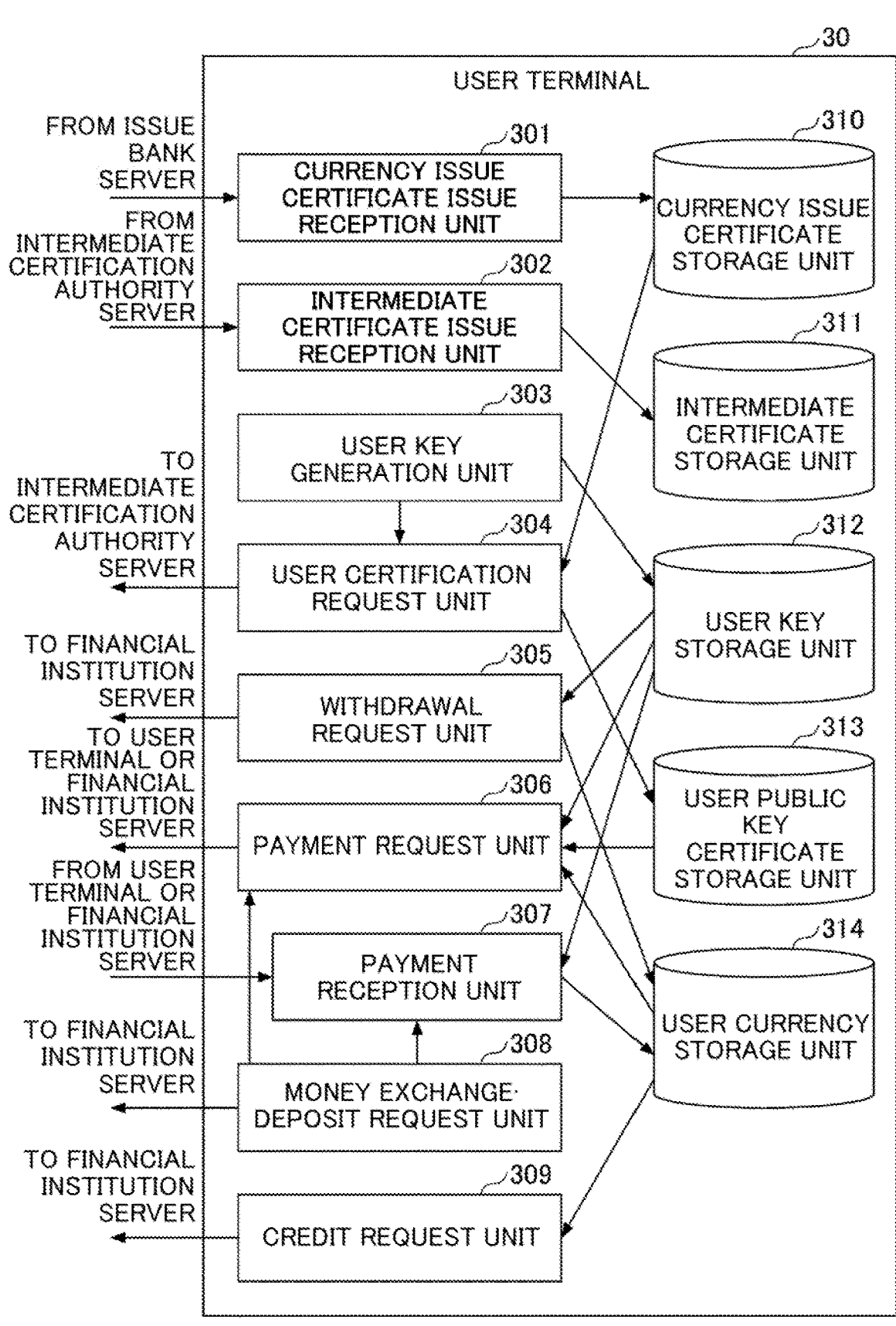

[Fig. 7]
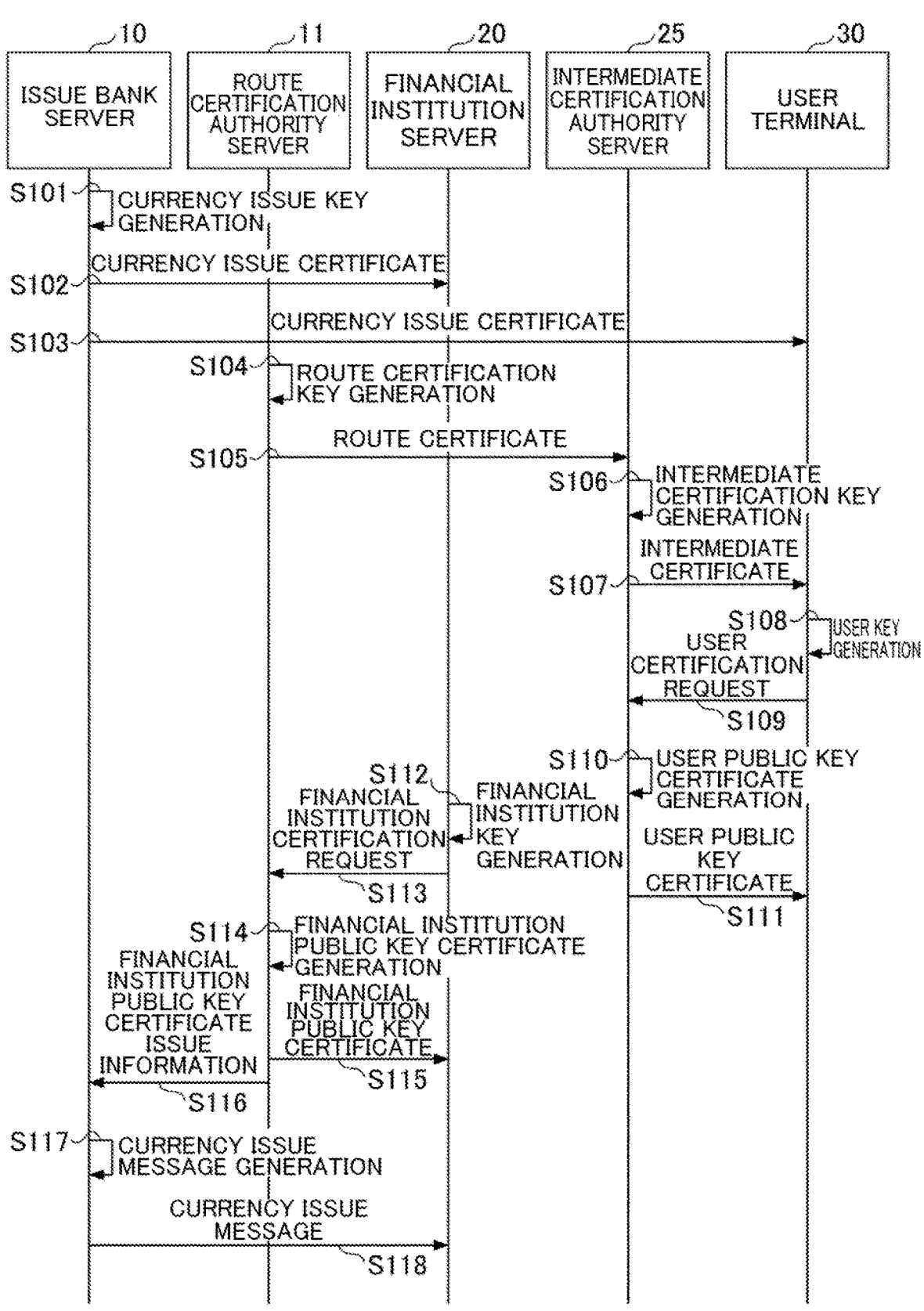

[Fig. 8]
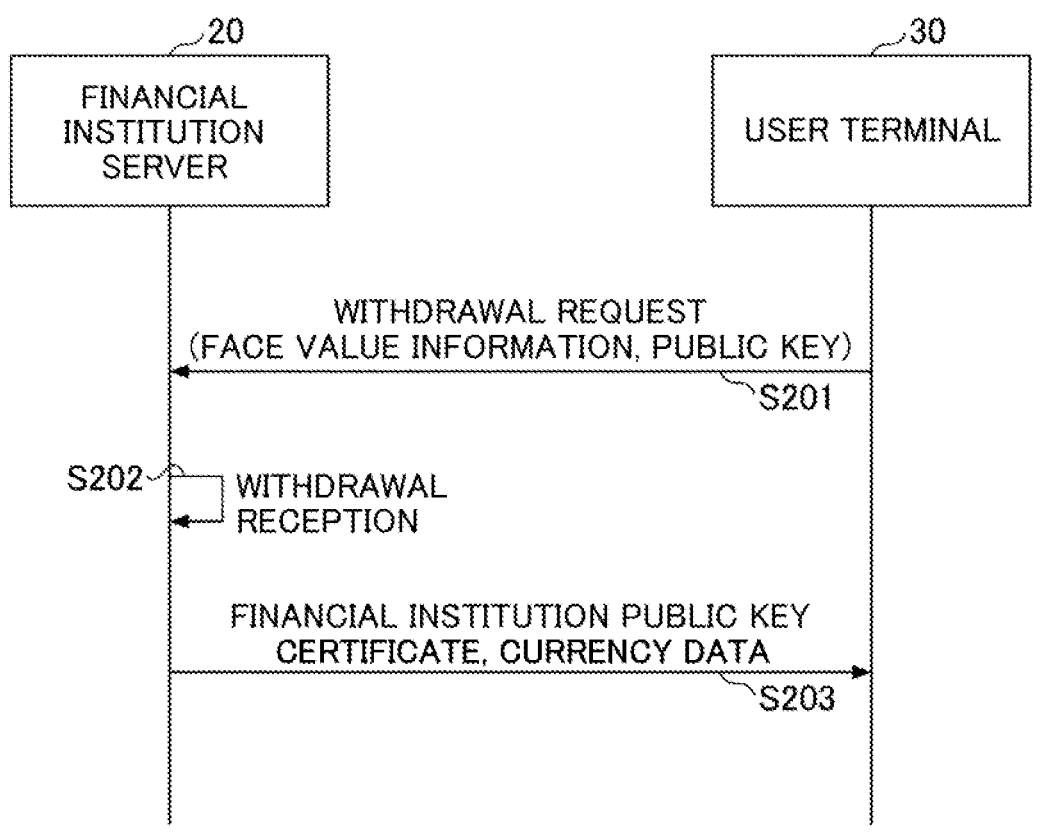

[Fig. 9]
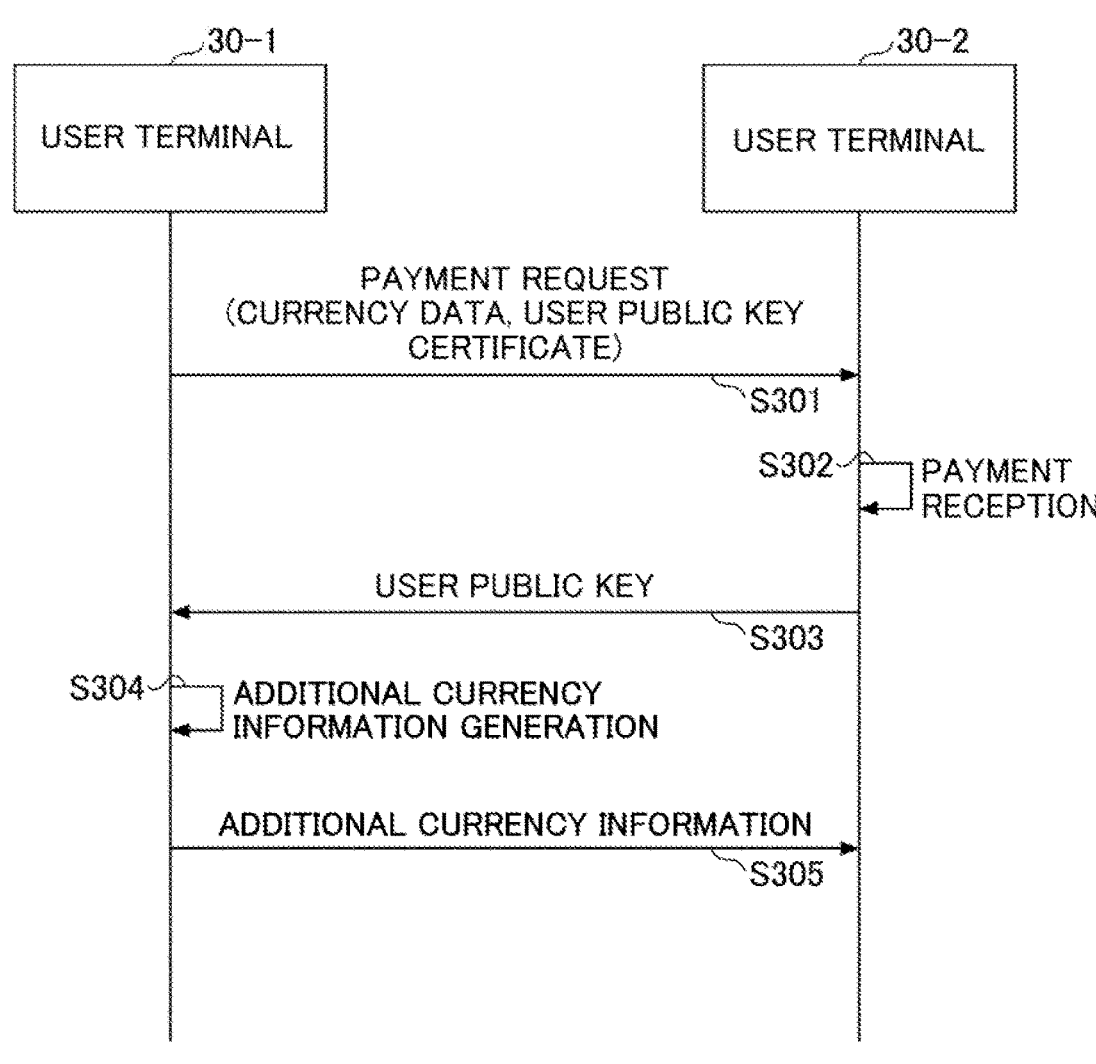

[Fig. 10]
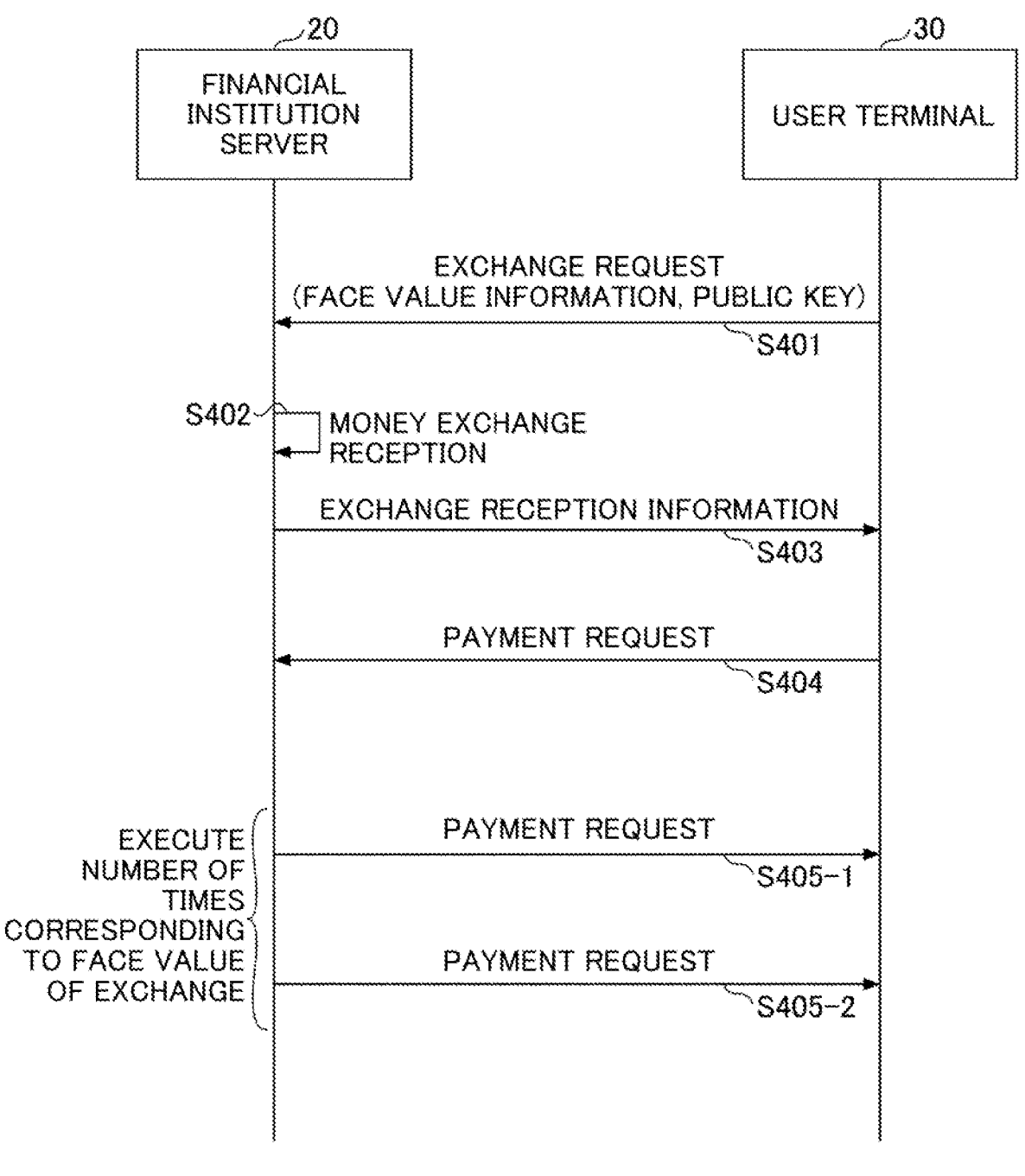

[Fig. 11]
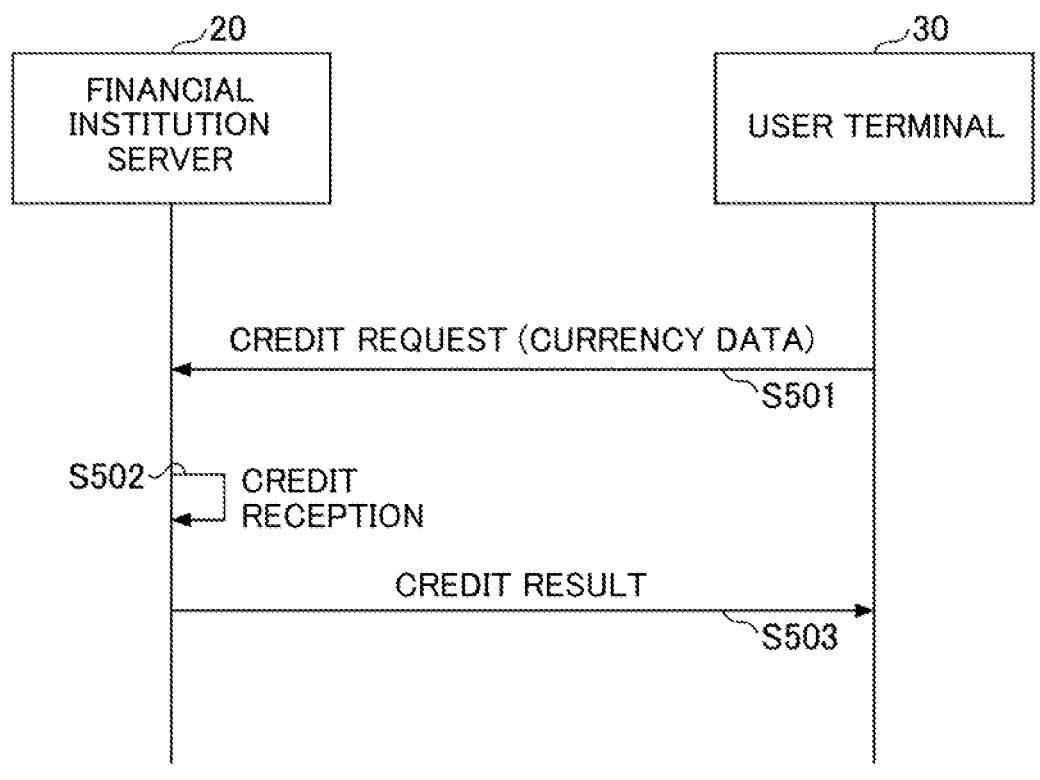

[Fig. 12]
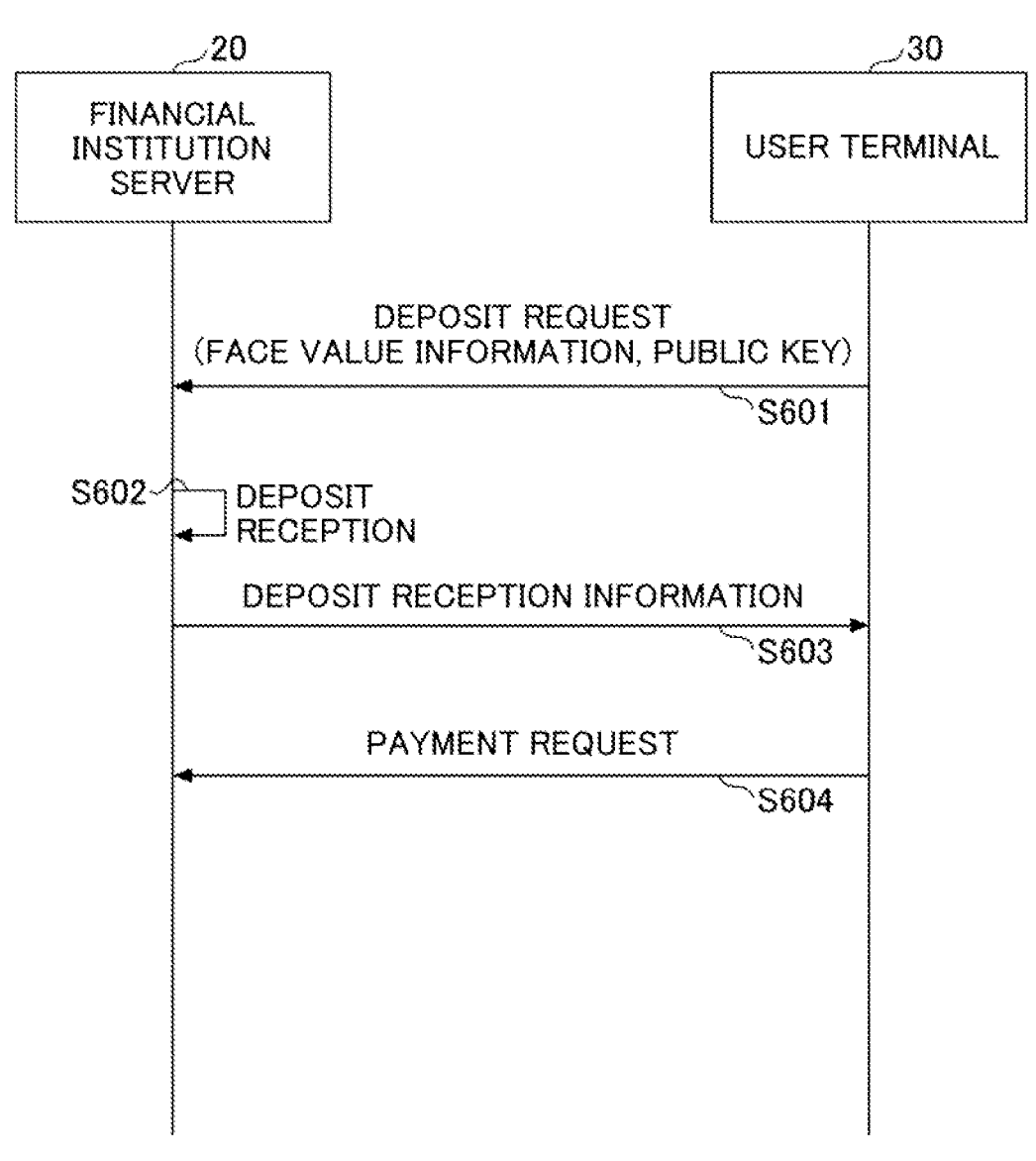

[Fig. 13]
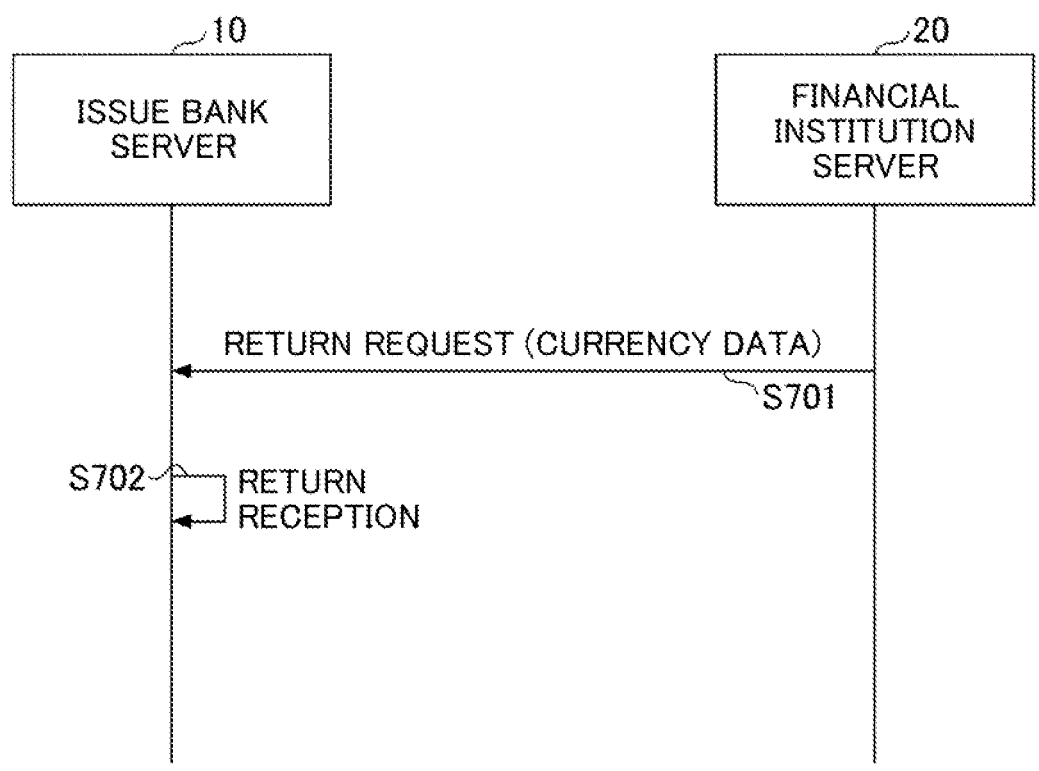

[Fig. 14]
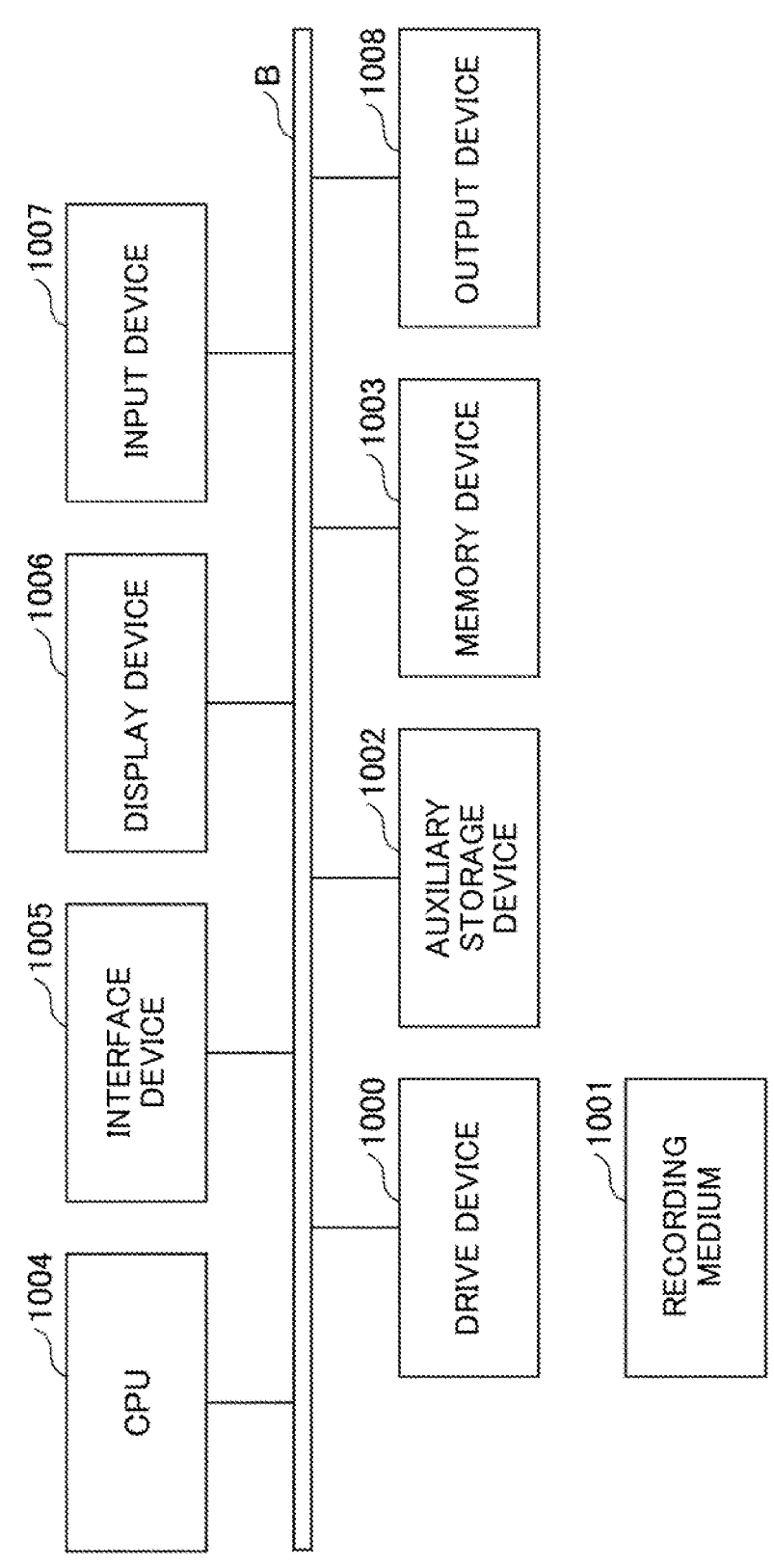

[Fig. 15]
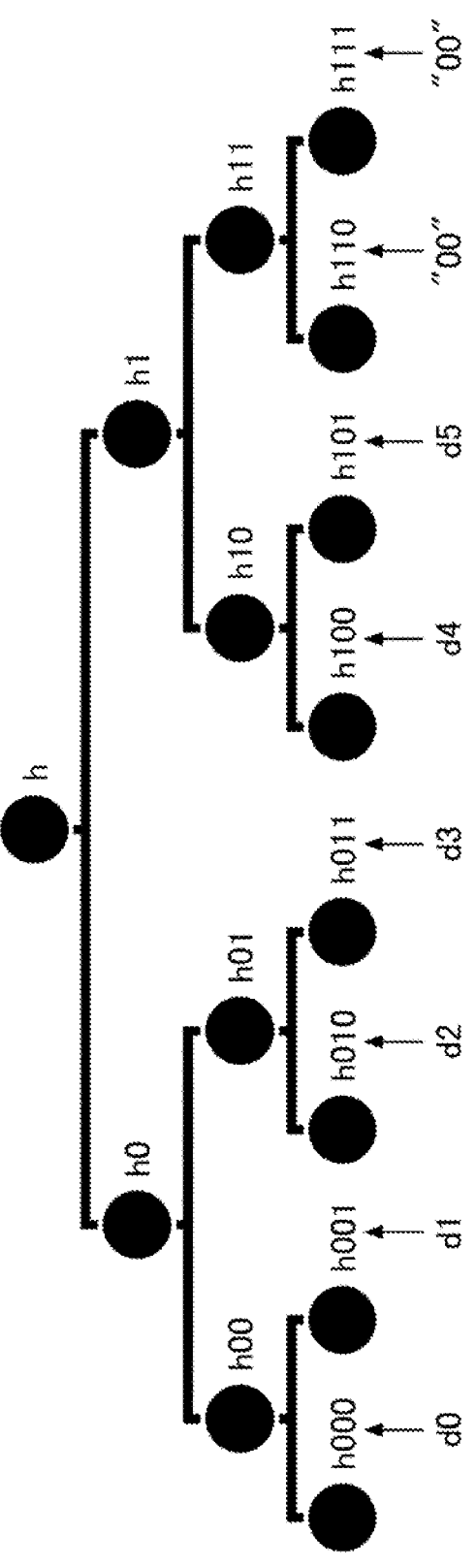

[Fig. 16]
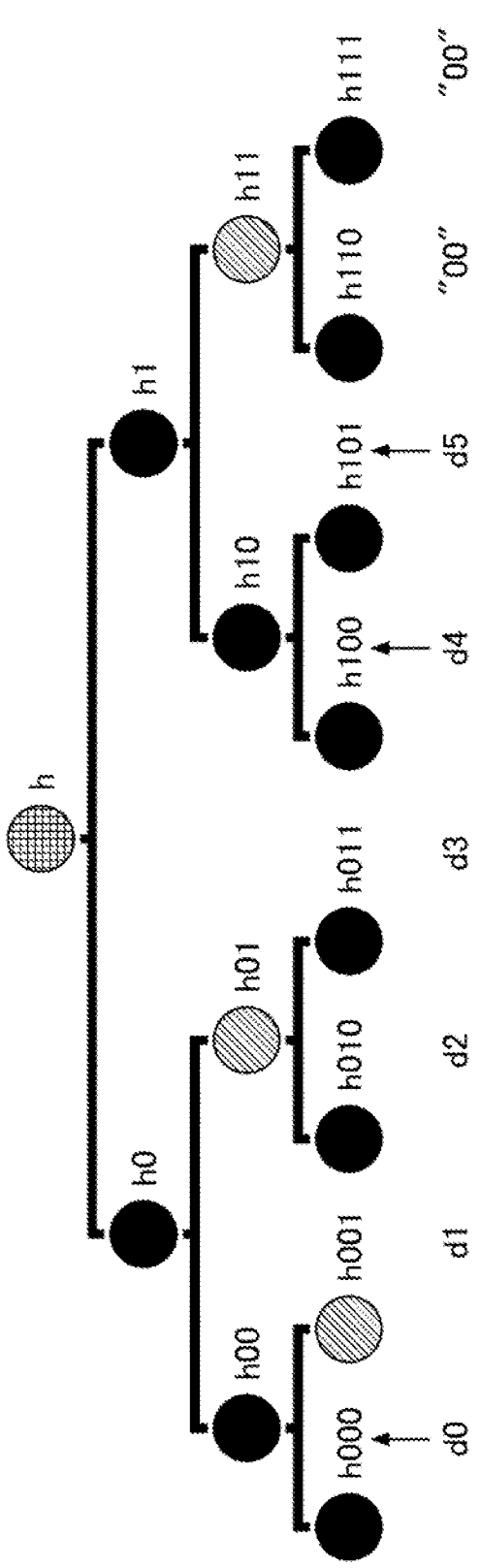

[Fig. 17]
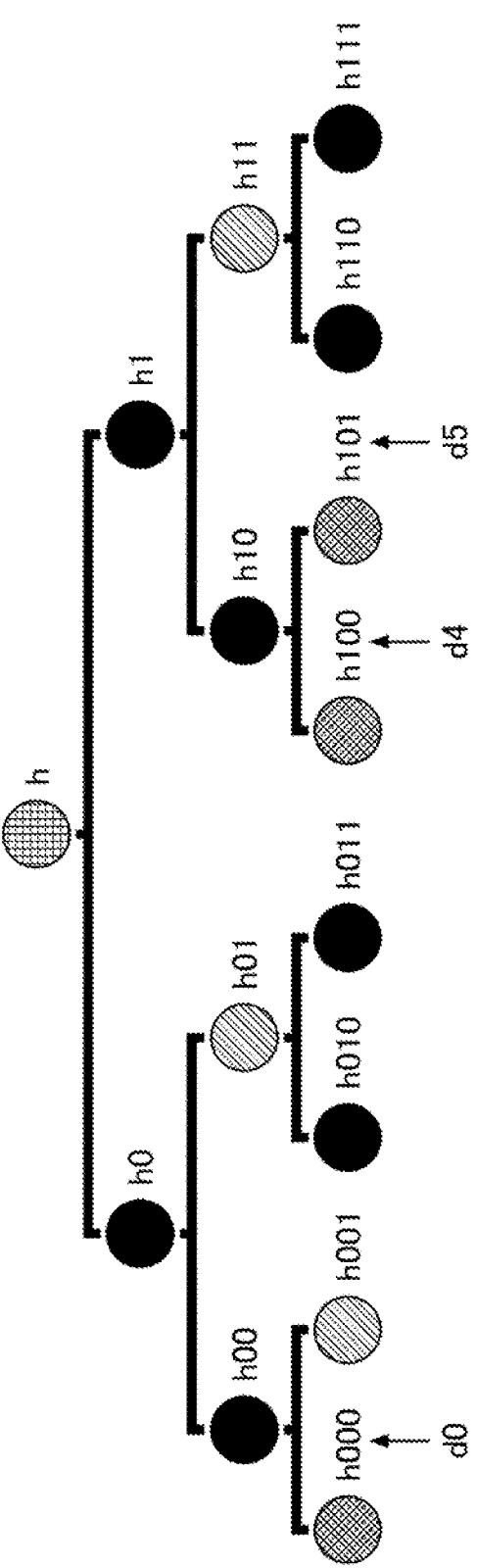

[Fig. 18]
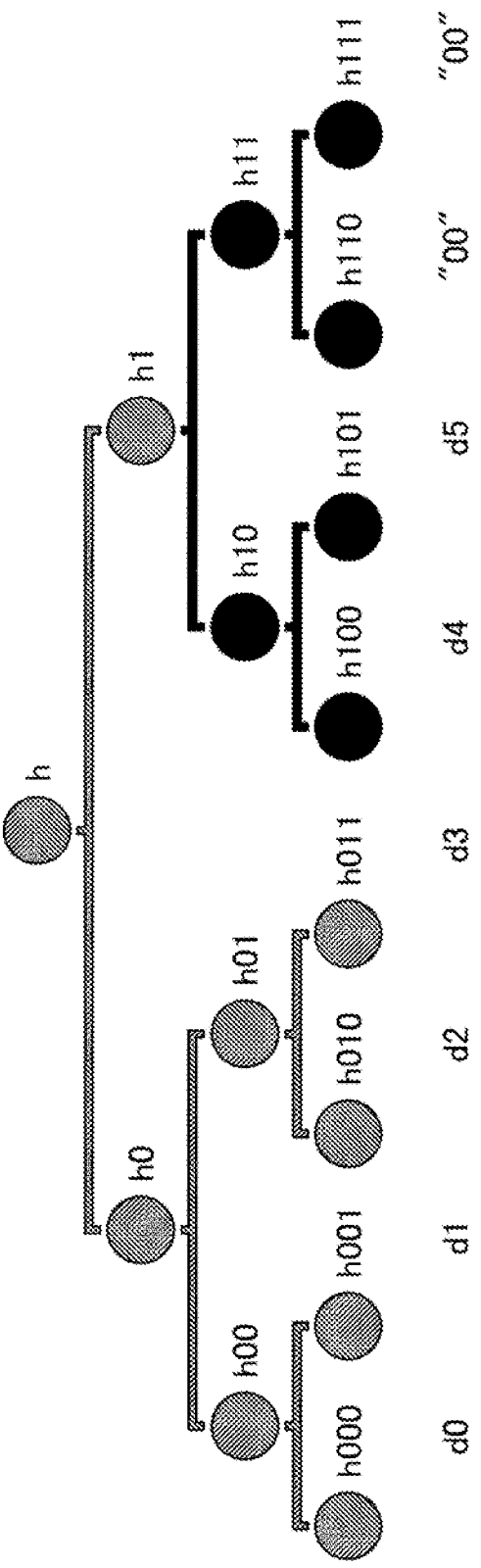

[Fig. 19]
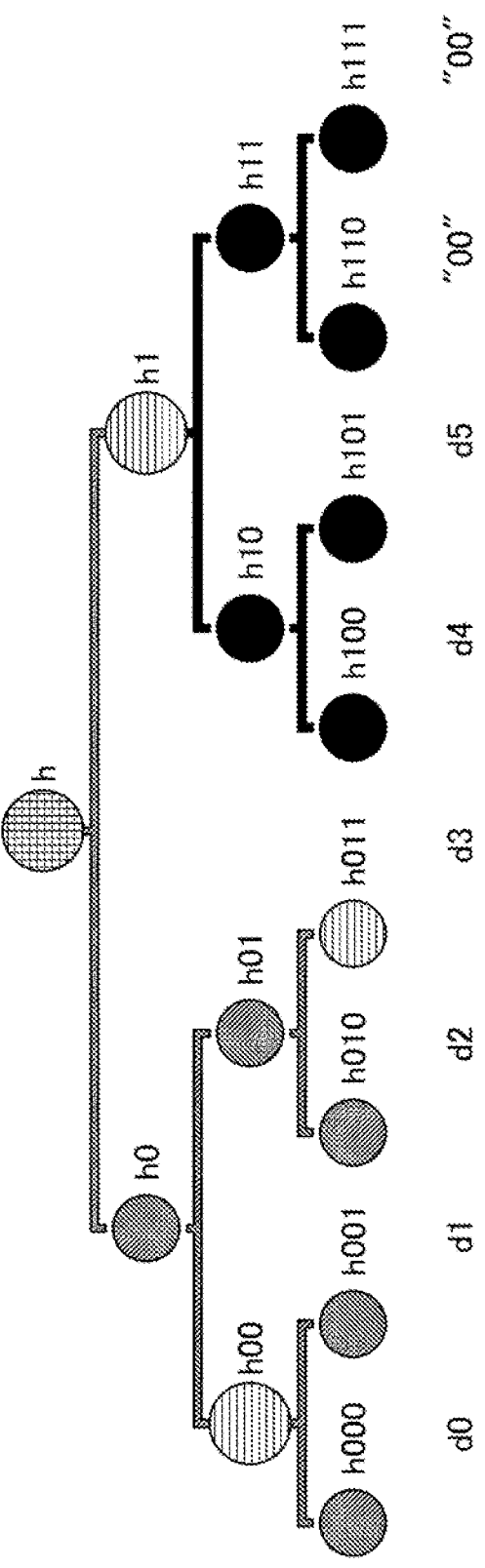

[Fig. 20]
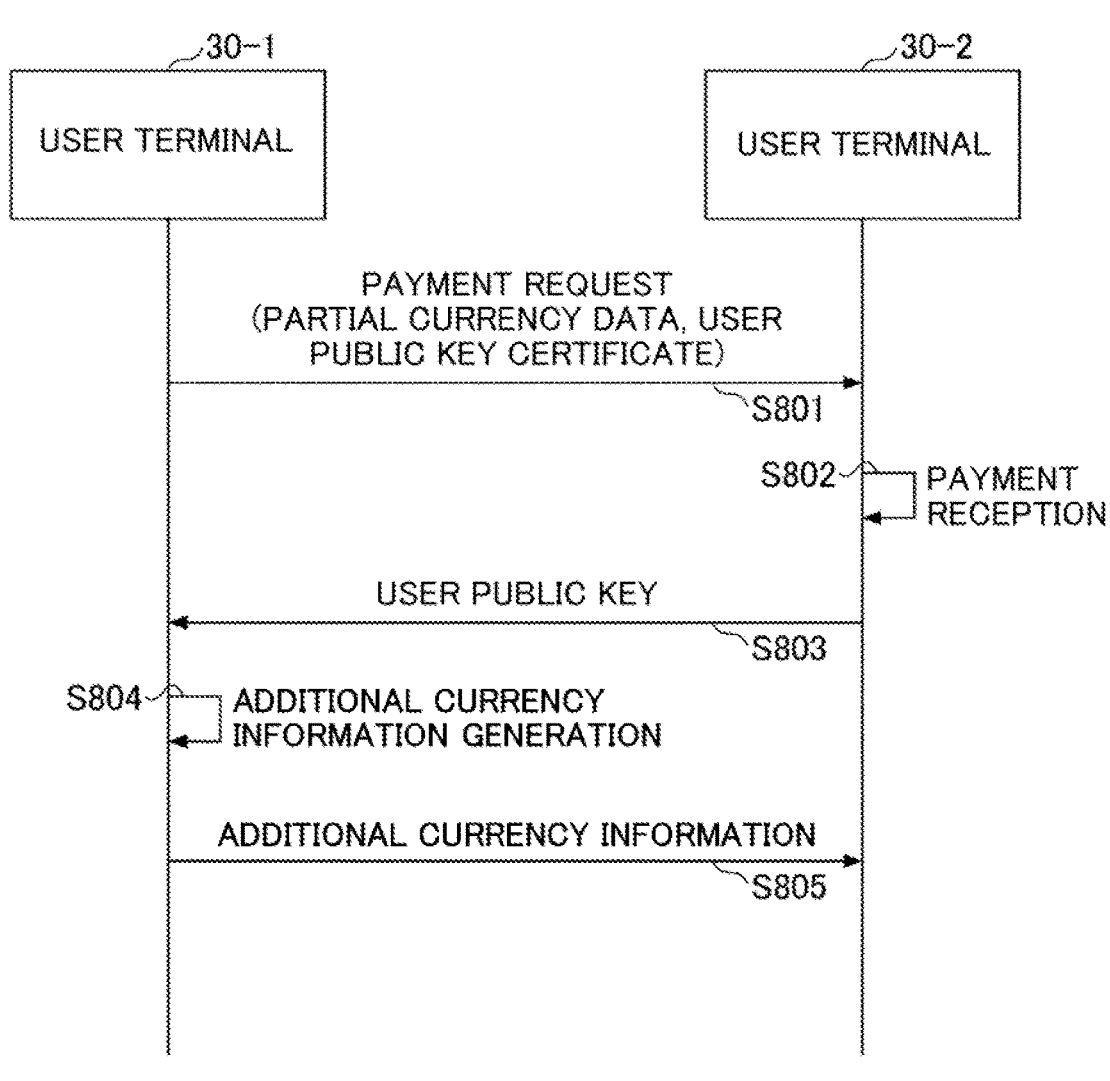

ELECTRONIC CURRENCY SYSTEM, INFORMATION PROCESSING APPARATUS, ELECTRONIC CURRENCY ISSUING METHOD AND PROGRAM

TECHNICAL FIELD

The present invention relates to an electronic currency system, an information processing apparatus, an electronic currency issuing method and a program.

BACKGROUND ART

An electronic currency has been studied for many years. An experiment has been conducted in which an issue bank of legal currency such as The Bank of Japan issues the electronic currency and distributes the electronic currency through a financial institution on the Internet.

For example, a technique for realizing the electronic currency using an encrypted communication function, a certification function and the like is disclosed in NPL 1. Further, a technique for realizing the electronic currency having a dividable usability by using a table of a hierarchical structure is disclosed in NPL 2.

CITATION LIST

Non-Patent Literature

NPL 1: Ohta, Abe, Fujisaki, and Mori, "Electronic cash system", NTT R&D, vol. 44, No. 10, pp. 931 to 938, 1995
NPL 2: Okamoto and Ohta, "One system of ideal electronic cash system", IEICE Transaction of Fundamentals of Electronics, Communications and Computer Science, June 1993

SUMMARY OF INVENTION

Technical Problem

However, in the related art, since it is necessary to inquire with an issue bank for confirming the validity of payment every time the user or the like performs the payment (transaction) processing of the electronic currency, the transaction cannot be completed only between the users, and there is a problem that the processing takes time and effort.

The disclosed technique is intended to complete the transaction only between users.

Solution to Problem

The disclosed technique is an electronic currency system including an issue bank server and a financial institution server, wherein the issue bank server includes a currency issue certificate issue unit that generates a currency issue certificate and transmits the generated currency issue certificate to the financial institution server, and a currency issue unit that adds a signature to a currency issue message in a predetermined electronic currency unit and transmits the currency issue message to the financial institution server, and the financial institution server includes a currency issue certificate issue reception unit that receives issue of the currency issue certificate from the issue bank server, and a currency issue reception unit that receives the currency issue message from the issue bank server, verifies the signature of the received currency issue message based on the currency issue certificate, and stores the issued currency in an unused currency storage unit.

Advantageous Effects of Invention

A transaction can be completed only between users.

BRIEF DESCRIPTION OF DRAWINGS

FIG. 1 is a diagram showing an example of a system configuration of an electronic currency system.
FIG. 2 is a functional configuration diagram of an issue bank server.
FIG. 3 is a functional configuration diagram of a route certification authority server.
FIG. 4 is a functional configuration diagram of a financial institution server.
FIG. 5 is a functional configuration diagram of an intermediate certification authority.
FIG. 6 is a functional configuration diagram of a user terminal.
FIG. 7 is a sequence diagram showing an example of a flow of currency issue processing.
FIG. 8 is a sequence diagram showing an example of a flow of withdrawal processing.
FIG. 9 is a sequence diagram showing an example of a flow of payment processing according to Example 1.
FIG. 10 is a sequence diagram showing an example of a flow of money exchange processing.
FIG. 11 is a sequence diagram showing an example of a flow of credit processing.
FIG. 12 is a sequence diagram showing an example of a flow of deposit processing.
FIG. 13 is a sequence diagram showing an example of a flow of return processing.
FIG. 14 is a diagram showing a hardware configuration example of a computer.
FIG. 15 is a diagram for describing an MHTree function of a Merkle tree according to Example 2.
FIG. 16 is a first diagram for describing a MHPath function of the Merkle tree according to Example 2.
FIG. 17 is a diagram for describing a MHVer function of the Merkle tree according to Example 2.
FIG. 18 is a diagram for describing a MHSubtruct function of the Merkle tree according to Example 2.
FIG. 19 is a second diagram for describing the MHPath function of the Merkle tree according to Example 2.
FIG. 20 is a sequence diagram showing an example of a flow of payment processing according to Example 2.

DESCRIPTION OF EMBODIMENTS

Embodiments of the present invention (the present embodiment) will be described below with reference to the drawings. Embodiments to be described below are merely exemplary, and the embodiments to which the present invention is applied are not limited to the following embodiments.

Overview of Present Embodiment

An electronic currency system according to the present embodiment is an electronic currency system like in Central Bank Digital Currency (CBDC) in which the electronic currency is issued in a specific issue bank (a central bank in the case of CBDC and The Bank of Japan in the case of yen). It is proposed that a value of the electronic currency is guaranteed to be the same value as the legal currency. The electronic currency having the same value as that of Japanese yen will be described below as an example, but this is by no means a limitation. The electronic currency may be the electronic currency having the same value as that of legal currency in other countries, or the electronic currency not having the same value as that of legal currency such as CBDC.

In the electronic currency system according to the present embodiment, the server managed by the issue bank issues the electronic currency (hereinafter simply referred to as currency) by signing each predetermined electronic currency unit (e.g., 1,000 yen). Also, the history data of transactions are managed by financial institutions other than the issue bank (in the case of CBDC, a city bank). In addition, in a transaction between users, terminals of the users directly communicate with each other to execute the processing for the transaction.

Example 1 and Example 2 will be described below, as examples of the present embodiment.

Example 1

FIG. 1 is a diagram showing an example of a system configuration of an electronic currency system. An electronic currency system 1 according to the present example includes an issue bank server 10, a route certification authority server 11, a financial institution server 20, an intermediate certification authority server 25, and a user terminal 30. These devices are communicably connected to each other via a communication network, such as the Internet.

The issue bank server 10 is an information processing apparatus managed by the issue bank (e.g., a central bank such as The Bank of Japan) which issues the currency. The issue bank server 10 adds signature data to message data indicating the issue of currency and transmits the message data to the financial institution server 20. In addition, the issue bank server 10 has a function of receiving a request for return from the financial institution server 20.

The route certification authority server 11 is an information processing apparatus having a function of a route certification authority in encrypted communication. The route certification authority server 11 may be realized by the same hardware as the issue bank server 10, and is assumed to be managed by the issue bank, but is not limited thereto.

The route certification authority server 11 generates a route certification key, issues a route certificate, and transmits it to the intermediate certification authority server 12 as a preparation stage for issuing the currency. In addition, the route certification authority server 11 certifies each financial institution, generates financial institution public key certificate issue information, and transmits the generated financial institution public key certificate issue information to the issue bank server 10.

The financial institution server 20 is an information processing apparatus managed by a financial institution (for example, a city bank). The financial institution server 20 receives the certification by the route certification authority server 11 and receives the issue of currency from the issue bank server 10.

In addition, the financial institution server 20 receives a transaction request from the user terminal 30 such as withdrawal, money exchange, deposit and credit. Further, the financial institution server 20 requests return from the issue bank server 10.

Note that, in the following description, when distinguishing each financial institution server 20, each financial institution server 20 is described as a financial institution server 20-1, a financial institution server 20-2, etc.

The intermediate certification authority server 25 is an information processing apparatus having a function of an intermediate certification authority in the encrypted communication. The intermediate certification authority server 25 may be implemented by the same hardware as the financial institution server 20, and is assumed to be managed by the financial institution, but is not limited thereto.

The intermediate certification authority server 25 generates an intermediate certification key, issues an intermediate certificate, and transmits the intermediate certificate to the user terminal 30 as a preparation stage for issuing the currency. The intermediate certification authority server 25 certifies each user and generates user public key certificate issue information.

Note that, in the following description, when the intermediate certification authority servers 25 are distinguished from each other, each intermediate certification authority server 25 is described as an intermediate certification authority server 25-1, an intermediate certification authority server 25-2, etc.

The user terminal 30 is an information processing apparatus used by a user (personal consumer, store, or the like) using the currency. The user terminal 30 receives certification by the intermediate certification authority server 25 before starting the transaction. Further, the user terminal 30 requests the transaction such as the withdrawal, the money exchange, the deposit, and the credit from the financial institution server 20.

Note that, in the following description, when distinguishing each user terminal 30, each user terminal 30 is described as a user terminal 30-1, a user terminal 30-2, etc.

The user terminal 30 (for example, the user terminal 30-1) requests the payment from another user terminal 30 (for example, the user terminal 30-2) or receives a request for the payment. Here, the payment request is to request the user to receive the execution of the "payment" transaction to be paid to the other party, not to request the other party to pay to the user.

Functional Configuration Example of Each Device According to Example 1

Next, a functional configuration example of each device according to Example 1 will be described.

FIG. 2 is a functional configuration diagram of the issue bank server. The issue bank server 10 includes a currency issue key generation unit 101, a currency issue certificate issue unit 102, a financial institution public key certificate issue information acquisition unit 103, a currency issue unit 104, a return reception unit 105, a currency issue key storage unit 106, and a returned currency storage unit 107.

The currency issue key generation unit 101 generates encryption key data (hereinafter referred to as a currency issue key) for guaranteeing the validity of message data (hereinafter referred to as a currency issue message) indicating the issue of currency. The currency issue key includes a secret key and a public key.

The currency issue certificate issue unit 102 generates data (hereinafter referred to as a currency issue certificate) indicating a certificate for certifying the public key of the currency issue key, and transmits the generated currency issue certificate to each financial institution server 20 and each user terminal 30.

The financial institution public key certificate issue information acquisition unit 103 acquires the financial institution public key certificate issue information from the route certification authority server 11. The financial institution public key certificate issue information will be described below.

The currency issue unit 104 generates a currency issue message by using the currency issue key and the financial institution public key certificate issue information, and transmits the generated currency issue message to the financial institution server 20.

The return reception unit 105 receives return from the financial institution server 20, and stores the returned currency in the returned currency storage unit 107. The return is a transaction in which currency not currently used by each financial institution is deposited in the issue bank and returned to distribution.

The currency issue key storage unit 106 stores the currency issue key generated by the currency issue key generation unit 101.

The returned currency storage unit 107 stores the currency (hereinafter referred to as returned currency) whose return is received by the return reception unit 105.

FIG. 3 is a functional configuration diagram of the route certification authority server. The route certification authority server 11 includes a route certification key generation unit 111, a route certificate issue unit 112, a financial institution certification unit 113, a financial institution public key certificate issue information transmission unit 114, a route certification key storage unit 115, and a financial institution public key certificate issue information storage unit 116.

The route certification key generation unit 111 generates encryption key data (hereinafter referred to as a route certification key) for guaranteeing the validity of the route certification authority. The route certification key includes a secret key and a public key.

The route certificate issue unit 112 issues certificate data (hereinafter referred to as a route certificate) for guaranteeing the validity of certificate data (hereinafter referred to as an intermediate certificate) for guaranteeing the validity of the intermediate certification authority, and transmits the certificate data to each intermediate certification authority server 25.

The financial institution certification unit 113 receives the encryption key data (hereinafter referred to as a financial institution key) for guaranteeing the validity of each financial institution from the financial institution server 20, and receives a request for certification. Then, the financial institution certification unit 113 generates data (hereinafter referred to as a financial institution public key certificate) indicating a certificate for certifying a public key of the financial institution key, and transmits the generated financial institution public key certificate to the financial institution server 20 which has requested certification. Further, the financial institution certification unit 113 generates information (hereinafter referred to as financial institution public key certificate issue information) indicating the issue of the financial institution public key certificate.

The financial institution public key certificate issue information transmission unit 114 transmits the generated financial institution public key certificate issue information to the issue bank server 10. Note that, when the issue bank server 10 and the route certification authority server 11 are realized by the same hardware, the financial institution public key certificate issue information transmission unit 114 is not required.

The route certification key storage unit 115 stores the route certification key generated by the route certification key generation unit 111.

The financial institution public key certificate issue information storage unit 116 stores the financial institution public key certificate issue information generated by the financial institution certification unit 113.

FIG. 4 is a functional configuration diagram of the financial institution server. The financial institution server 20 includes a currency issue certificate issue reception unit 201, a financial institution key generation unit 202, a financial institution certification request unit 203, a currency issue reception unit 204, a withdrawal reception unit 205, an update processing unit 206, a money exchange/deposit reception unit 207, a payment request unit 208, a payment reception unit 209, a credit reception unit 210, a return request unit 211, a currency issue certificate storage unit 212, a financial institution key storage unit 213, a financial institution public key certificate storage unit 214, an unused currency storage unit 215, an in-use currency storage unit 216, an updated currency storage unit 217, and a used currency storage unit 218.

The currency issue certificate issue reception unit 201 receives the issue of the currency issue certificate from the issue bank server 10.

The financial institution key generation unit 202 generates a financial institution key. The financial institution key includes a secret key and a public key.

The financial institution certification request unit 203 transmits the financial institution key to the route certification authority server 11 to request the certification of the financial institution, and receives the financial institution public key certificate from the route certification authority server 11.

The currency issue reception unit 204 receives the issue of currency from the issue bank server 10. Specifically, the currency issue reception unit 204 receives the currency issue message from the issue bank server 10, and verifies a signature of the received currency issue message by using the public key included in the currency issue certificate.

The withdrawal reception unit 205 receives a withdrawal request from the user terminal 30, and transmits currency to the user terminal 30.

The update processing unit 206 updates the used currency (hereinafter referred to as used currency) as necessary in response to a request for withdrawal from the user terminal 30. Specifically, the update processing unit 206 deletes information (additional currency information) added to the used currency. Note that the additional currency information is added by a payment transaction described below. The withdrawal reception unit 205 transmits the unused currency (hereinafter referred to as unused currency) or currency updated by the update processing unit 206 to the user terminal 30.

The money exchange/deposit reception unit 207 receives a request of money exchange or deposit from the user terminal 30. Specifically, when the money exchange/deposit reception unit 207 receives a request for money exchange from the user terminal 30, the payment reception unit 209 receives payment of a face value to be exchanged, the payment request unit 208 requests a plurality of payments having a face value to be exchanged in total. In addition, when the money exchange/deposit reception unit 207 receives a request for deposit, the payment reception unit 209 receives payment of a face value to be deposited.

The credit reception unit 210 receives the currency from the user terminal 30 and receives a request for credit. The credit reception unit 210 judges whether or not the currency is an in-use currency (hereinafter referred to as an in-use currency), and transmits a judgement result to the user terminal 30.

The return request unit 211 transmits the currency to the issue bank server 10 to request the return.

The currency issue certificate storage unit 212 stores the currency issue certificate whose issue is received by the currency issue certificate issue reception unit 201.

The financial institution key storage unit 213 stores the financial institution key generated by the financial institution key generation unit 202.

The financial institution public key certificate storage unit 214 stores the financial institution public key certificate received from the route certification authority server 11 by the financial institution certification request unit 203.

The unused currency storage unit 215 stores, as the unused currency, the currency whose issue is received by the currency issue reception unit 204.

The in-use currency storage unit 216 stores, as the in-use currency, the currency whose withdrawal is received by the withdrawal reception unit 205.

The updated currency storage unit 217 stores the currency updated by the update processing unit 206 (hereinafter referred to as updated currency) in a state before update.

The used currency storage unit 218 stores a currency which was used and is not in-use. Specifically, the used currency storage unit 218 stores, as the used currency, the currency received by receiving a request for money exchange or deposit by the money exchange/deposit reception unit 207 and receiving payment by the payment reception unit 209.

FIG. 5 is a functional configuration diagram of the intermediate certification authority server. The intermediate certification authority server 25 includes an intermediate certification key generation unit 251, an intermediate certificate issue unit 252, a user certification unit 253, an intermediate certification key storage unit 254, and a user public key certificate issue information storage unit 255.

The intermediate certification key generation unit 251 generates encryption key data (hereinafter referred to as an intermediate certification key) for guaranteeing the validity of the intermediate certification authority. The intermediate certification key includes a secret key and a public key.

The intermediate certificate issue unit 252 issues an intermediate certificate and transmits it to each user terminal 30.

The user certification unit 253 receives the encryption key data (hereinafter referred to as a user key) for guaranteeing the validity of each user from the user terminal 30, and receives a request for certification. Then, the user certification unit 253 generates data (hereinafter referred to as a user public key certificate) indicating a certificate for certifying the public key of the user key, and transmits the generated user public key certificate to the user terminal 30 which has requested certification. Further, the user certification unit 253 generates information (hereinafter referred to as user public key certificate issue information) indicating the issue of the user public key certificate.

The intermediate certification key storage unit 254 stores the intermediate certification key generated by the intermediate certification key generation unit 251.

The user public key certificate issue information storage unit 255 stores the user public key certificate issue information generated by the user certification unit 253.

FIG. 6 is a functional configuration diagram of the user terminal. The user terminal 30 includes a currency issue certificate issue reception unit 301, an intermediate certificate issue reception unit 302, a user key generation unit 303, a user certification request unit 304, a withdrawal request unit 305, a payment request unit 306, a payment reception unit 307, a money exchange/deposit request unit 308, a credit request unit 309, a currency issue certificate storage unit 310, an intermediate certificate storage unit 311, a user key storage unit 312, a user public key certificate storage unit 313, and a user currency storage unit 314.

The currency issue certificate issue reception unit 301 receives the issue of the currency issue certificate from the issue bank server 10.

The intermediate certificate issue reception unit 302 receives the issue of the intermediate certificate from the intermediate certification authority server 25.

The user key generation unit 303 generates a user key. The user key includes a secret key and a public key.

The user certification request unit 304 transmits the user key to the intermediate certification authority server 25 to request the certification of the user, and receives the user public key certificate from the intermediate certification authority server 25.

The withdrawal request unit 305 designates a face value and requests withdrawal from the financial institution server 20. The withdrawal request unit 305 receives the currency withdrawn from the financial institution server 20.

The payment request unit 306 transmits the currency to be paid and requests payment from the financial institution server 20 or another user terminal 30.

The payment reception unit 307 receives the currency to be paid and receives payment from the financial institution server 20 or another user terminal 30.

A money exchange/deposit request unit 308 requests money exchange or deposit from the financial institution server 20. Specifically, when the money exchange/deposit request unit 308 requests money exchange and the financial institution server 20 receives the money exchange, the payment request unit 306 transmits the currency of a face value to be exchanged and requests payment from the financial institution server 20, and the payment reception unit 307 receives a plurality of payments having a face value to be exchanged in total from the financial institution server 20. Also, when the money exchange/deposit request unit 308 requests deposit and the financial institution server 20 receives the deposit, the payment request unit 306 transmits the currency to be deposited, and requests payment from the financial institution server 20.

The credit request unit 309 transmits the currency, requests credit from the financial institution server 20, and receives a credit result.

The currency issue certificate storage unit 310 stores the currency issue certificate whose issue is received by the currency issue certificate issue reception unit 301.

The intermediate certificate storage unit 311 stores the intermediate certificate whose issue is received by the intermediate certificate issue reception unit 302.

The user key storage unit 312 stores the user key generated by the user key generation unit 303.

The user public key certificate storage unit 313 stores the user public key certificate received by the user certification request unit 304.

The user currency storage unit 314 stores currency being used by the user. Specifically, the user currency storage unit 314 stores the currency received from the financial institution server 20 by the withdrawal request unit 305 and the currency received from the financial institution server 20 or another user terminal 30 by the payment reception unit 307.

(Operation of Electronic Currency System According to Example 1)

Next, operations of the electronic currency system 1 according to Example 1 will be described. Then, description will be given while indicating a concept by using symbols in which the issue bank is Ba, each financial institution is $B_i$ ($B_0$, $B_1$, . . . ), the route certification authority is $A_0$, each intermediate certification authority is $A_i$ ($A_0$, $A_1$, . . . ), and each user is $U_j$ ($U_0$, $U_1$, . . . ).

FIG. 7 is a sequence diagram showing an example of a flow of currency issue processing. The currency issue processing is started periodically or upon receiving an operation or the like of a person in charge.

The currency issue key generation unit 101 of the issue bank server 10 generates a currency issue key (step S101). Specifically, the currency issue key generation unit 101 generates a pair of currency issue keys (a secret key $skB_{0vy}$, and a public key $pkB_{0vy}$) corresponding to the issue year y and the issue amount v.

Then, the currency issue certificate issue unit 102 transmits a currency issue certificate CERT ($pkB_{0vy}$) for certifying the public key $pkB_{0vy}$, to each financial institution server 20 (step S102), and transmits it to each user terminal 30 (step S103). The currency issue certificate issue reception unit 201 of each financial institution server 20 receives the currency issue certificate CERT ($pkB_{0vy}$) and stores it in the currency issue certificate storage unit 212. Also, the currency issue certificate issue reception unit 301 of each user terminal 30 receives the currency issue certificate CERT ($pkB_{0vy}$) and stores it in the currency issue certificate storage unit 310.

The issue amount v may be less than one yen. For example, when issuing a currency of 0.1 yen in 2021 year, the currency issue certificate issue unit 102 transmits a currency issue certificate CERT ($pkB_{0\ (0.1\_yen)\ (2021\_year)}$) to each financial institution server 20 and each user terminal 30.

Note that, the currency issue certificate issue unit 102 does not need to directly transmit the currency issue certificate CERT ($pkB_{0vy}$) to each financial institution server 20 and each user terminal 30, for example, uploads the currency issue certificate CERT to a server device or the like disclosed in a communication network, and each financial institution server 20 and each user terminal 30 may download the currency issue certificate CERT.

Next, the route certification key generation unit 111 of the route certification authority server 11 generates a route certification key (step S104). The route certification key includes a secret key $skA_0$ and a public key $pkA_0$.

Subsequently, the route certificate issue unit 112 generates a route certificate Auth ($pkA_0$) by signing with the secret key $skA_0$, and transmits it to each financial institution server 20 (step S105).

Note that the route certificate issue unit 112 does not need to directly transmit the route certificate Auth ($pkA_0$) to each financial institution server 20, for example, uploads the route certificate Auth to a server device or the like disclosed in a communication network, and each financial institution server 20 may download the route certificate Auth.

Subsequently, the intermediate certification key generation unit 251 of the intermediate certification authority server 25 generates an intermediate certification key (step S106). The intermediate certification key includes a secret key ski and a public key $pkA_i$.

Next, the intermediate certificate issue unit 252 signs with the secret key ski and generates an intermediate certificate Auth ($pkA_1$, $pkA_0$) by using the root certificate Auth ($pkA_0$). Hereinafter, the intermediate certificate Auth ($pkA_i$, $pkA_0$) is referred to as Auth ($pkA_i$). Then, the intermediate certificate issue unit 252 transmits the generated intermediate certificate Auth ($pkA_i$) to each user terminal 30 (step S107). The intermediate certificate issue reception unit 302 of each user terminal 30 receives the intermediate certificate Auth ($pkA_i$) and stores it in the intermediate certificate storage unit 311.

Note that the intermediate certificate issue unit 252 does not need to directly transmit the intermediate certificate Auth ($pkA_i$) to each user terminal 30, for example, uploads the intermediate certificate Auth to a server device or the like disclosed in a communication network, and each user terminal 30 may download the intermediate certificate Auth.

Subsequently, the user key generation unit 303 of the user terminal 30 generates a user key (step S108). The user key includes a secret key $sku_j$ and a public key $pkU_j$. Next, the user certification request unit 304 transmits the public key $pkU_j$ and requests the intermediate certification authority server 25 to perform user certification (step S109).

The user certification unit 253 of the intermediate certification authority server 25 generates the user public key certificate Auth ($pkU_j$, $pkA_i$, $pkA_0$) by using the route certificate Auth ($pkA_0$) and the intermediate certificate Auth ($pkA_i$) (step S110). Hereinafter, the user public key certificate Auth ($pkU_j$, $pkA_i$, $pkA_0$) will be described as Auth ($pkU_j$). The user certification unit 253 transmits the generated user public key certificate Auth ($pkU_j$) to the user terminal 30 (step S111).

Further, the user certification unit 253 generates user public key certificate issue information ($U_j$, $pkU_j$, Auth ($pkU_j$)), and stores the information in the user public key certificate issue information storage unit 255. The user public key certificate issue information ($U_j$, $pkU_j$, Auth ($pkU_j$)) includes user's personal information $U_j$.

Next, the financial institution key generation unit 202 of the financial institution server 20 generates a financial institution key (step S112). The financial institution key includes a secret key $skB_i$ and a public key $pkB_i$. Next, the financial institution certification request unit 203 transmits the public key $pkB_i$ and requests financial institution certification from the route certification authority server 11 (step S113).

The financial institution certification unit 113 of the route certification authority server 11 generates a financial institution public key certificate Auth ($pkB_i$, $pkA_0$) by using the route certificate Auth ($pkA_0$) (step S114). Hereinafter, the financial institution public key certificate Auth ($pkB_i$, $pkA_0$) is described as Auth ($pkB_i$). The financial institution certification unit 113 transmits the generated financial institution public key certificate Auth ($pkB_i$) to the financial institution server 20 (step S115).

Further, the financial institution certification unit 113 generates financial institution public key certificate issue information ($B_i$, $pkB_i$, Auth ($pkB_i$)), and stores the financial institution public key certificate issue information in the financial institution public key certificate issue information storage unit 116. Note that the financial institution public key certificate issue information ($B_i$, $pkB_i$, Auth ($pkB_i$)) includes institution information $B_i$ about the financial institution. Then, the financial institution public key certificate issue information transmission unit 114 transmits financial institution public key certificate issue information ($B_i$, $pkB_i$, Auth ($pkB_i$)) to the issue bank server 10 (step S116).

The financial institution public key certificate issue information acquisition unit 103 of the issue bank server 10 acquires the financial institution public key certificate issue information ($B_i$, $pkB_i$, Auth ($pkB_i$)) and stores it in the financial institution public key certificate issue information storage unit 116.

Note that the processing order from the step S108 to the step S111 and the processing order from the step S112 to the step S116 are an example and may be reversed. The processing from the step S108 to the step S111 is individually executed by each user terminal 30. The processing from the step S112 to the step S116 is individually executed by each financial institution server 20.

In addition, the user terminal 30 may execute processing from the step S108 to the step S111 a plurality of times in order to add a user key.

Next, the currency issue unit 104 of the issue bank server 10 uses the financial institution public key certificate issue information ($B_i$, $pkB_i$, Auth ($pkB_i$)) stored in the financial institution public key certificate issue information storage unit 116 to generate a currency issue message (v, y, $B_i$, $pkB_i$) designating an issue amount v, an issue year y and a financial institution $B_i$ (step S117). Here, the currency issue unit 104 signs by using the secret key $skB_{0,y}$ of the currency issue key stored in the currency issue key storage unit 106. The currency issue unit 104 transmits the currency issue message (v, y, $B_i$, $pkB_i$), to which the signature $S_0$ is added, to the financial institution server 20 (step S118).

The currency issue reception unit 204 of the financial institution server 20 receives the currency issue message (v, y, $B_i$, $pkB_i$) to which the signature $S_0$ is added, and verifies the signature $S_0$ by using the public key $pkB_{0,y}$ included in the currency issue certificate CERT ($pkB_{0,y}$) stored in the currency issue certificate storage unit 212. Then, the currency issue reception unit 204 generates a currency $T_0$: =(v, y, $B_i$, $pkB_i$, Sa) and stores it in the unused currency storage unit 215.

FIG. 8 is a sequence diagram showing an example of a flow of withdrawal processing. The withdrawal processing is started in response to an operation for instructing withdrawal by the user $U_j$.

The withdrawal request unit 305 of the user terminal 30 transmits face value information indicating the face value v to be withdrawn and the public key $pkU_j$ of the user key stored in the user key storage unit 312, and requests the financial institution server 20 to withdraw (step S201).

The withdrawal reception unit 205 of the financial institution server 20 receives a withdrawal (step S202). Specifically, the withdrawal reception unit 205 cuts off unused currency To matching the face value v from the unused currency storage unit 215, and stores it in the in-use currency storage unit 216 as in-use currency ($T_1$, $T_0$) to which additional currency information $T_1$=($pkU_j$, $S_1$) is added. $S_1$ is signature data using the secret key $skB_i$ of the financial institution key.

Subsequently, the withdrawal reception unit 205 transmits currency data of in-use currency ($T_1$, $T_0$) and the financial institution public key certificate Auth ($pkB_i$) to the user terminal 30 (step S203). The withdrawal request unit 305 of the user terminal 30 verifies the currency data of the in-use currency ($T_1$, $T_0$) and the financial institution public key certificate Auth ($pkB_i$), and stores the in-use currency ($T_1$, $T_0$) in the user currency storage unit 314.

Note that, in the step S202, the withdrawal reception unit 205 may not use the unused currency stored in the unused currency storage unit 215 but use the used currency stored in the used currency storage unit 218 as necessary. In this case, the update processing unit 206 updates the used currency and updates the currency to the currency from which the additional currency information is deleted. The withdrawal reception unit 205 determines whether or not to use the used currency according to a predetermined condition. For example, the withdrawal reception unit 205 may use the used currency when the used currency becomes a data amount equal to or more than a threshold value.

For example, when the withdrawal reception unit 205 uses the used currency ($T_n$, . . . , $T_0$) for the withdrawal, the update processing unit 206 stores the currency in the state before update ($T_n$, . . . , $T_0$) in the updated currency storage unit 217. Then, the update processing unit 206 updates the used currency ($T_n$, . . . , $T_0$) to the currency $T_0$ from which the additional currency information ($T_n$, . . . , $T_1$) is deleted. Then, the withdrawal reception unit 205 stores the in-use currency ($T_{n+1}$, $T_0$), in which the additional currency information $T_{n+1}$: =($pkU_j$, $S_n$+1) is added to the updated currency $T_0$, in the in-use currency storage unit 216.

Subsequently, the withdrawal reception unit 205 transmits the currency data of in-use currency ($T_{n+1}$, $T_0$) and the financial institution public key certificate Auth ($pkB_i$) to the user terminal 30 (step S203). The withdrawal request unit 305 of the user terminal 30 verifies the currency data of in-use currency ($T_{n+1}$, $T_0$) and the financial institution public key certificate Auth ($pkB_i$), and stores the in-use currency ($T_{n+1}$/$T_0$) in the user currency storage unit 314.

Further, the update processing unit 206 may re-update the currency that has already been updated once or more. In this case, the update processing unit 206 stores a currency ($T_{n+k}$, . . . , $T_1$, $T_0$), which is obtained by combining the currency ($T_m$, . . . , $T_1$, $T_0$) in the state before the previous update with a currency ($T_{n+k}$, . . . , $T_{n+1}$, $T_0$) in the state before the current update, in the updated currency storage unit 217.

FIG. 9 is a sequence diagram showing an example of a flow of payment processing according to Example 1. The payment processing is started in response to an operation for instructing payment to the user $U_k$ on the money reception side by the user U; on the money transfer side.

The user terminal 30-1 is a user terminal 30 operated by the user $U_j$ on the money transfer side. The user terminal 30-2 is a user terminal 30 operated by the user $U_k$ on the money reception side. The payment request unit 306 of the user terminal 30-1 transmits the currency $T_0$, which is currency data excluding the additional currency information from the currency ($T_{n-1}$, . . . , $T_0$) of a payment amount v, and the user public key certificate Auth ($pkU_j$), and requests payment from the user terminal 30-2 (step S301).

The payment reception unit 307 of the user terminal 30-2 receives the payment (step S302). Specifically, the payment reception unit 307 verifies the currency $T_0$ and the user public key certificate Auth ($pkU_j$). Here, the payment reception unit 307 verifies signature data included in the currency in the verification of the currency. For example, the payment reception unit 307 verifies the signature $S_0$ of the currency $T_0$: =(v, y, $B_i$, $pkB_i$, $S_0$).

Next, the payment reception unit 307 transmits the public key $pkU_k$ of the user key stored in the user key storage unit 312 of the user terminal 30-2 to the user terminal 30-1 (step S303). The payment request unit 306 of the user terminal 30-1 signs the received public key $pkU_k$ by using the secret key $skU_j$ of the user key stored in the user key storage unit 312 of the user terminal 30-1, and generates the additional currency information $T_n$: =($pkU_k$, S.) (step S304).

The payment request unit 306 transmits the additional currency information ($T_n$, . . . , $T_1$), obtained by adding the generated currency addition information In: =($pkU_k$, S.) to the additional currency information ($T_{n-1}$, . . . . $T_1$), to the user terminal 30-2 (step S305).

The payment reception unit 307 of the user terminal 30-2 verifies the additional currency information $(T_n, \ldots, T_1)$. Specifically, the payment reception unit 307 verifies each signature data included in the additional currency information. For example, the payment reception unit 307 verifies the signature $S_{n-1}$ of the additional currency information $T_{n-1}$: =(pkU$_j$, $S_{n-1}$). The payment reception unit 307 stores the currency $(T_n, \ldots, T_0)$, obtained by adding the additional currency information $(T_n, \ldots, T_1)$ to the received currency $T_0$, in the user currency storage unit 314 of the user terminal 30-2.

FIG. 10 is a sequence diagram showing an example of a flow of money exchange processing. The money exchange processing is started in response to an operation of instructing money exchange by the user $U_j$.

The money exchange/deposit request unit 308 of the user terminal 30 transmits face value information indicating a face value v of money exchange and the public key pkU$_j$ of the user key stored in the user key storage unit 312, and requests the money exchange from the financial institution server 20 (step S401).

The money exchange/deposit reception unit 207 of the financial institution server 20 receives the money exchange (step S402). The money exchange/deposit reception unit 207 transmits money exchange reception information indicating reception of the money exchange to the user terminal 30 (step S403).

When the money exchange/deposit request unit 308 of the user terminal 30 receives the money exchange reception information, the payment request unit 306 requests payment from the financial institution server 20 in accordance with the payment processing shown in FIG. 9 (step S404).

In addition, when exchanging money to $v_1, \ldots, v_x$ which become money exchange amount v by totaling, the payment request unit 208 of the financial institution server 20 requests payment from the user terminal 30 in accordance with the payment processing shown in FIG. 9 for each of $v_1, \ldots, v_x$ (steps S405-1, S405-2).

FIG. 11 is a sequence diagram illustrating an example of a flow of credit processing. The credit processing is started in response to an operation for instructing the credit by the user $U_j$.

The credit request unit 309 of the user terminal 30 transmits a currency $T_0$ whose availability is desired to be confirmed, and requests credit from the financial institution server 20 (step S501). The credit reception unit 210 of the financial institution server 20 receives the credit (step S502).

Specifically, the credit reception unit 210 retrieves the currency $T_0$ from the in-use currency storage unit 216, and transmits a credit result indicating a credit success ack to the user terminal 30 when a record including the $T_0$, for example, $(T_1, T_0)$ is present (step S503).

FIG. 12 is a sequence diagram illustrating an example of a flow of deposit processing. The deposit processing is started in response to an operation for instructing deposit by the user $U_j$.

The money exchange/deposit request unit 308 of the user terminal 30 transmits face value information indicating the face value v of deposit and the public key pkU$_j$ of the user key stored in the user key storage unit 312, and requests money exchange from the financial institution server 20 (step S601).

The money exchange/deposit reception unit 207 of the financial institution server 20 receives the deposit (step S602). The money exchange/deposit reception unit 207 transmits deposit reception information indicating the reception of deposit to the user terminal 30 (step S603).

When the money exchange/deposit request unit 308 of the user terminal 30 receives the deposit reception information, the payment request unit 306 requests payment from the financial institution server 20 in accordance with payment processing shown in FIG. 9 (step S604).

FIG. 13 is a sequence diagram showing an example of a flow of return processing. The return processing is started in response to an operation of instructing return of the financial institution $B_i$.

The return request unit 211 of the financial institution server 20 transmits currency data to be returned, and requests return from the issue bank server 10 (step S701). The currency data to be returned may be unused currency or used currency. When the unused currency is returned, the return request unit 211 extracts the unused currency $T_0$ from the unused currency storage unit 215 and transmits it to the issue bank server 10.

In addition, when the used currency is returned, the return request unit 211 extracts the used currency $(T_n, \ldots, T_0)$ from the used currency storage unit 218 and transmits it to the issue bank server 10. Also, when the used currency $(T_m, \ldots, T_{k+1}, T_0)$ has been updated, the return request unit 211 reads out the additional currency information $(T_k, \ldots, T_1)$ before update from the updated currency storage unit 217, combines it with the used currency $(T_m, \ldots, T_{k+1}, T_0)$, and transmits the combined $(T_m, \ldots, T_0)$ to the issue bank server 10.

The return reception unit 105 of the issue bank server 10 receives the return (step S702). Specifically, the return reception unit 105 stores the received currency data in the returned currency storage unit 107.

Hardware Configuration Example According to Present Embodiment

Each device included in the electronic currency system 1 can be realized, for example, by causing a computer to execute a program describing the processing contents described in this embodiment. Note that the "computer" may be a physical machine or a virtual machine on the cloud. When using the virtual machine, the "hardware" described here is virtual hardware.

The program can be recorded on a computer-readable recording medium (portable memory, and the like), stored, and distributed. It is also possible to provide the program through a network such as the Internet or an email.

FIG. 14 is a diagram showing a hardware configuration example of the computer. The computer shown in FIG. 14 includes a drive device 1000, an auxiliary storage device 1002, a memory device 1003, a CPU 1004, an interface device 1005, a display device 1006, an input device 1007, an output device 1008, and the like which are connected to each other via a bus B, respectively.

The program implementing processing in the computer is provided from a recording medium 1001 such as a CD-ROM or a memory card, for example. When the recording medium 1001 storing the program is set in the drive device 1000, the program is installed onto the auxiliary storage device 1002 from the recording medium 1001 via the drive device 1000. However, the program may not necessarily be installed from the recording medium 1001 and may be downloaded from another computer via the network. The auxiliary storage device 1002 stores the installed program and also stores required files, data, and the like.

The memory device 1003 reads out and stores the program from the auxiliary storage device 1002 when there is an instruction to start the program. The CPU 1004 realizes functions related to the device in accordance with the program stored in the memory device 1003. The interface device 1005 is used as an interface for connection to the network. The display device 1006 displays a graphical user interface (GUI) or the like by the program. The input device 1007 is constituted by a keyboard and a mouse and a button or a touch panel or the like, and is used for receiving various operation instructions. The output device 1008 outputs calculation results. Note that a graphics processing unit (GPU) or a tensor processing unit (TPU) may be included in the computer instead of the CPU 1004, or a GPU or a TPU may be included in addition to the CPU 1004. In this case, the processing may be shared and executed such that the GPU or TPU executes processing requiring special calculation such as a neural network, and the CPU 1004 executes other processing.

Effects of Example 1

According to the electronic currency system 1 according to the present example, the issue bank server 10 issues a currency by signing for each predetermined electronic currency unit, and a chain of signatures in subsequent transactions is executed for each predetermined electronic currency unit. Thus, the issued currency can be easily managed.

In addition, the financial institution server 20 manages a history of the transaction by including it in the currency as the additional currency information. Further, since the financial institution server 20 can refresh the additional currency information including the chain of signatures by update processing to reduce data of currency, thus, the communication amount can be reduced. Further, since the processing can be completed without interposing the issue bank server 10 in various transactions, the load of the processing of the issue bank server 10 can be reduced.

Example 2

Next, Example 2 will be described. Example 2 is different from Example 1 in that a target currency is collectively signed by generating a Hash tree of the currency and signing a route of the Hash tree. In the following description of Example 2, the differences from Example 1 are mainly described, and the same reference numerals as those used in the description of Example 1 are given to those having the same functional structures as those of Example 1, and the description thereof is omitted.

Basic Techniques Used in Example 2

First, the basic technique used in the present example will be described. In the present example, four functions MHTree, MHPath, MHVer, and MHSubtruct utilizing the Hash tree called a Merkle tree (reference literature [1]) are used.

FIG. 15 is a diagram for describing the MHTree function of the Merkle tree according to Example 2. The MHTree function is a function for generating the Hash tree from a data set.

Specifically, the MHTree function is a function for inputting data set D and outputting a Hash tree L={(leaf_id, leaf_val)} which is a binary tree constituted by Hash values. Here, a vertex h is referred to as a route. In the following description, MHTree $(D) \rightarrow L$ is described, for example. Note that FIG. 15 is an example of n=6. In the seventh and eighth positions, "00" is complemented to make the binary tree.

FIG. 16 is a first diagram for describing the MHPath function of the Merkle tree according to Example 2. The MHPath function is a function for generating a path necessary for certificating the partial data set.

Specifically, the MHPath function is a function for inputting a partial data set D' to be certified (D'={d0, d4, d5} in the case of FIG. 16) and outputting a certification path AP (h001, h01, h11 in FIG. 16) and a route h necessary for the certification. In the following description, MHPath (D', L)$\rightarrow$(Ap, h) is described, for example.

FIG. 17 is a diagram for describing the MHVer function of the Merkle tree according to Example 2. The MHVer function is a function for verifying the partial data set by the certification path.

Specifically, the MHVer function is a function for verifying sub-data D' (D'={d0, d4, d5} in the case of FIG. 17) from the path AP (h001, h01, h11 in FIG. 17) and the route h necessary for the certification. In the following description, MHVer (Ap, h, D')$\rightarrow$TorF is described, for example.

FIG. 18 is a diagram for describing the MHSubtruct function of the Merkle tree according to Example 2. The MHSubtruct function is a function for updating an appropriate node in consideration of partial data of the Hash tree.

Specifically, the MHSubtruct function is a function for deleting a partial data set D' from the Hash tree L (D'={d0, d4, d5} in the case of FIG. 18) and generating a new Hash tree L'. In the following description, MHSubtruct (L, D')$\rightarrow$L' is described, for example.

FIG. 19 is a second diagram for describing the MHPath function of the Merkle tree according to Example 2. FIG. 19 shows the MHPath function in the case where there is a partial data set D' of D' (D"={d2} in the case of FIG. 19) and L' subtracted from the original Hash tree L is used.

Operation Example of Electronic Currency System According to Example 2

The withdrawal reception unit 205 of the financial institution server 20 according to the present example cuts off a data set To of currency matching a face value v from the unused currency storage unit 215, generates a Hash tree $L_1$=MHTree $(T_0)$, and signs a root H of the Hash tree. Data set $T_0$: =$(T_0\_t)$: =$((v\_t, y\_t, B_i, pkB_i, S_0\_t)$, t=1, . . . , s, $\Sigma v\_t=v$ is established.

Then, the withdrawal reception unit 205 stores it as the in-use currency $(T_1, T_0)$ to which $T_1$: =$(pkU_j, H, S_1)$ is added, in the in-use currency storage unit 216. In this case, the withdrawal reception unit 205 transmits the currency data of in-use currency $(T_1, T_0)$ and the financial institution public key certificate Auth $(pkB_i)$ to the user terminal 30.

FIG. 20 is a sequence diagram showing an example of a flow of payment processing according to Example 2.

The payment request unit 306 of the user terminal 30-1 transmits a partial currency $T_0$'=$(T_0\_i)$, T_i $(AP_{n-1}, H_{n-1})$=MHPath $(T_0', L_{n-1})$ and the user public key certificate Auth $(pkU_j)$ from the currency $T_0$ having a value equal to or more than a payment amount v, and requests payment from the user terminal 30-2 (step S801). Here, a Hash tree $L_{n-1}'$ of the remaining currency excluding the partial currency $T_0'$ from the currency $T_0$ is generated from the original Hash tree $L_{n-1}$ by the MHSubtruct $(L_{n-1}, T_0')\rightarrow L_{n-1}'$ in the user currency storage unit 314 of the user terminal 30-1.

The payment reception unit 307 of the user terminal 30-2 receives payment (step S302). Specifically, the payment reception unit 307 verifies the currency $T_0$ and the user public key certificate Auth $(pkU_j)$. Here, the payment reception unit 307 verifies the signature data included in the currency in verification of the currency. For example, the payment reception unit 307 verifies the signature $S_0$ of the currency $T_0\_i$: $=(v, y, B_i, pkB_i, S_0)$, and verifies the currency $T_0'$ by using the MHVer $(AP_{n-1}, H_{n-1}, T_0')$.

Next, the payment reception unit 307 transmits the public key $pkU_k$ of the user key stored in the user key storage unit 312 of the user terminal 30-2 to the user terminal 30-1 (step S303). The payment request unit 306 of the user terminal 30-1 signs the received public key $pkU_k$ by using the secret key $skU_j$ of the user key stored in the user key storage unit 312 of the user terminal 30-1, and generates the additional currency information $T_n$: $=(pkU_k, H_n, S_n)$ (step S304). Here, $H_n$ is obtained by the MHTree $(T_0')$.

The payment request unit 306 transmits the generated additional currency information $(T_n, \ldots, T_1)$, obtained by adding the generated additional currency information $T_n$: $=(pkU_k, H_n, S_n)$ to the additional currency information $(T_{n-1}, \ldots, T_1)$, to the user terminal 30-2 (step S305).

The payment reception unit 307 of the user terminal 30-2 verifies the additional currency information $(T_n, \ldots, T_1)$. Specifically, the payment reception unit 307 verifies each signature data included in the additional currency information. For example, the payment reception unit 307 verifies the signature $S_{n-1}$ of the additional currency information $T_{n-1}$: $=(pkU_j, S_{n-1})$. The payment reception unit 307 stores the currency $(T_n, \ldots, T_0')$ obtained by adding the additional currency information $(T_n, \ldots, T_1)$ to the received currency $T_0'$ in the user currency storage unit 314 of the user terminal 30-2.

Thus, the electronic currency system 1 can execute the payment processing of the payment amount v by a single transaction by using the currency $T_0$ equal to or more than the payment amount v.

Further, the electronic currency system 1 may execute payment processing by a plurality of transactions by using a plurality of currencies $T_0\_x$ and $T_0\_y$ which become equal to or more than the payment amount v by totaling.

The payment request unit 306 of the user terminal 30-1 transmits: the partial currency $T_0\_x' = (T_0\_x\_i)$, $T_0\_y' = \{T_0\_y\_i\}$, $Ti\_x$, $T_1\_y$, $(HT_{n-1}\_x, H_{n-1}\_X) = \text{MHPath}$ $(T_0\_x', L_{n-1}\_x)$, $(HT_{m-1}\_y, H_{m-1}\_y) = \text{MHPath}$ $(T_0\_y', L_{m-1}\_y)$ from a plurality of currencies $T_0\_x$ and $T_0\_y$ which become equal to or more than the payment amount v by totaling; and the user public key certificate Auth $(pkU_j)$, and requests payment from the user terminal 30-2 (step S801). Here, in the user currency storage unit 314 of the user terminal 30-1, the Hash tree $L_{n-1}\_x'$ of the remaining currency excluding the partial currency $T_0\_x'$ is generated from the currency $T_0\_x$ by the MHSubtruct $(L_{n-1}\_x, T_0\_x') \rightarrow L_{n-1}\_x'$ from the original Hash tree $L_{n-1}\_X$, and the Hash tree $L_{m-1}\_y'$ of the remaining currency excluding the partial currency $T_0\_y'$ is generated from the currency $T_0\_y$ by the MHSubtruct $(L_{m-1}\_y, T_0\_y') \rightarrow L_{m-1}\_y'$ from the original Hash tree $L_{m-1}\_y$.

The payment reception unit 307 of the user terminal 30-2 receives the payment (step S302). Specifically, the payment reception unit 307 verifies the currency $T_0$ and the user public key certificate Auth $(pkU_j)$. Here, the payment reception unit 307 verifies the signature data included in the currency in verification of the currency. For example, the payment reception unit 307 verifies the signature $S_0$ of the currency $T_0\_i$: $=(v, y, B_i, pkB_i, S_0)$, verifies the currency $T_0\_x'$ by using the MHVer $(HT_{n-1}\_x, H_{n-1}\_x, T_0\_x')$ and verifies the currency $T_0\_y'$ by using MHVer $(HT_{m-1}\_y, H_{m-1}\_y, T_0\_y')$.

Next, the payment reception unit 307 transmits the public key $pkU_k$ of the user key stored in the user key storage unit 312 of the user terminal 30-2 to the user terminal 30-1 (step S303). The payment request unit 306 of the user terminal 30-1 signs the received public key $pkU_k$ by using the secret key $skU_j$ of the user key stored in the user key storage unit 312 of the user terminal 30-1, and generates the additional currency information $T_n$: $=(pkU_k, H_n, S_n)$ (step S304). Here, $H_n$ is obtained by MHTree $(T_0')$.

The payment request unit 306 transmits the currency addition information $(T_n, T_{n-1}\_X, \ldots, T_1\_X, T_{m-1}\_y, \ldots, T_1\_y)$, obtained by adding the generated additional currency information In: $=(pkU_k, H_n, S_n)$ to the additional currency information $(T_{n-1}\_x, \ldots, T_1\_x, T_{m-1}\_y, \ldots, T_1\_y)$, to the user terminal 30-2 (step S305).

The payment reception unit 307 of the user terminal 30-2 verifies the additional currency information $(T_n, T_{n-1}\_X, \ldots, T_1\_X, T_{m-1}\_y, \ldots, T_1\_y)$. Specifically, the payment reception unit 307 verifies each signature data included in the additional currency information. For example, the payment reception unit 307 verifies the signature $S_{n-1}$ of the additional currency information $T_{n-1}$: $=(pkU_j, S_{n-1})$. The payment reception unit 307 stores the currency $(T_n, \ldots, T_0')$, obtained by adding the additional currency information $(T_n, T_{n-1}\_X, \ldots, T_1\_X, T_{m-1}\_y, \ldots, T_1\_y)$ to the received currency $T_0'$, in the user currency storage unit 314 of the user terminal 30-2.

Thus, the electronic currency system 1 can execute payment processing by a plurality of transactions by using a plurality of currencies $T_0\_x$ and $T_0\_y$ which become equal to or more than the payment amount v by totaling.

REFERENCE LITERATURE

[1] Jakobsson M., Leighton $T_n$, Micali S., Szydlo M. (2003) Fractal Merkle Tree Representation and Traversal. In: Joye M. (eds) Topics in Cryptology—CT-RSA 2003. CT-RSA 2003. Lecture Notes in Computer Science, vol 2612. Springer, Berlin, Heidelberg.

Effects of Present Example

The electronic currency system according to the present example generates a Hash tree of currency and signs a route of the Hash tree to collectively sign the currency to be targeted. Thus, since the currency can be handled collectively as a data set, the processing load and the communication load of each device can be reduced.

Summary of Embodiment

The present specification describes at least the electronic currency system, information processing apparatus, electronic currency issuing method and program at least described in each following item.

Item 1

An electronic currency system, including: an issue bank server; and a financial institution server, wherein the issue bank server includes a currency issue certificate issue unit that generates a currency issue certificate and transmits the generated currency issue certificate to the financial institution server, and a currency issue unit that adds a signature to a currency issue message in a predetermined electronic currency unit and transmits the currency issue message to the financial institution server, and the financial institution server includes a currency issue certificate issue reception unit that receives issue of the currency issue certificate from the issue bank server, and a currency issue reception unit that receives the currency issue message from the issue bank server, verifies the signature of the received currency issue message based on the currency issue certificate, and stores the issued currency in an unused currency storage unit.

Item 2

The electronic currency system according to item 1, further including a user terminal, wherein the user terminal includes a withdrawal request unit configured to designate a face value and requests withdrawal from the financial institution server, and the financial institution server further includes a withdrawal reception unit configured to receive a withdrawal request from the user terminal, cut off currency that receives the withdrawal from the unused currency storage unit, store the currency in an in-use currency storage unit as in-use currency to which additional currency information including a signature is added, and transmit the in-use currency to the user terminal.

Item 3

The electronic currency system according to item 2, wherein the financial institution server further includes a used currency storage unit configured to store used currency to which the additional currency information is added, and an update processing unit configured to store the currency in a state before update in an updated currency storage unit when the withdrawal reception unit receives the withdrawal request, update the used currency to a currency from which the additional currency information is deleted, and store in-use currency obtained by adding additional currency information to updated currency in the in-use currency storage unit.

Item 4

The electronic currency system according to item 2 or 3, wherein the withdrawal reception unit generates a Hash tree of currency, and signs a route of the generated Hash tree to collectively sign the currency to be withdrawn.

Item 5

An information processing apparatus, including a currency issue certificate issue unit that generates a currency issue certificate and transmits the generated currency issue certificate to a financial institution server, and a currency issue unit that adds a signature to a currency issue message in a predetermined electronic currency unit and transmits the currency issue message to the financial institution server.

Item 6

An electronic currency issuing method executed by an electronic currency system including an issue bank server and a financial institution server, wherein the issue bank server executes a step of generating a currency issue certificate and transmitting the generated currency issue certificate to the financial institution server, and a step of adding a signature to a currency issue message in a predetermined electronic currency unit and transmitting the currency issue message to the financial institution server, and the financial institution server executes a step of receiving issue of the currency issue certificate from the issue bank server, and a step of receiving the currency issue message from the issue bank server, verifying the signature of the received currency issue message based on the currency issue certificate, and storing the issued currency in an unused currency storage unit.

Item 7

A program for causing a computer to function as each unit of the information processing apparatus according to item 5.

Although the present embodiment has been described above, the present invention is not limited to such a specific embodiment, and various modifications and changes can be made within the scope of the gist of the present invention described in the claims.

REFERENCE SIGNS LIST

1 Electronic currency system
10 Issue bank server
11 Route certification authority server
20 Financial institution server
25 Intermediate certification authority server
30 User terminal
101 Currency issue key generation unit
102 Currency issue certificate issue unit
103 Financial institution public key certificate issue information acquisition unit
104 Currency issue unit
105 Return reception unit
106 Currency issue key storage unit
107 Returned currency storage unit
111 Route certification key generation unit
112 Route certificate issue unit
113 Financial institution certification unit
114 Financial institution public key certificate issue information transmission unit
115 Route certification key storage unit
116 Financial institution public key certificate issue information storage unit
201 Currency issue Certificate issue reception unit
202 Financial institution key generation unit
203 Financial institution certification request unit
204 Currency issue reception unit
205 Withdrawal reception unit
206 Update processing unit
207 Money exchange/deposit reception unit
208 Payment request unit
209 Payment reception unit
210 Credit reception unit
211 Return request unit
212 Currency issue certificate storage unit
213 Financial institution key storage unit
214 Financial institution public key certificate storage unit
215 Unused currency storage unit
216 In-use currency storage unit
217 Updated currency storage unit

21

218 Used currency storage unit
251 Intermediate certification key generation unit
252 Intermediate certificate issue unit
253 User certification unit
254 Intermediate certification key storage unit
255 User public key certificate issue information storage unit
301 Currency issue certificate issue reception unit
302 Intermediate certificate issue reception unit
303 User key generation unit
304 User certification request unit
305 Withdrawal request unit
306 Payment request unit
307 Payment reception unit
308 Money exchange/deposit request unit
309 Credit request unit
310 Currency issue certificate storage unit
311 Intermediate certificate storage unit
312 User key storage unit
313 User public key certificate storage unit
314 User currency storage unit
1000 Drive device
1001 Recording medium
1002 Auxiliary storage device
1003 Memory device
1004 CPU
1005 Interface device
1006 Display device
1007 Input device
1008 Output device

The invention claimed is:

1. An electronic currency system, comprising:
an issue bank server; and
a financial institution server communicably connected to the issue bank server via a network, wherein
the issue bank server includes:
a first processor; and
a first memory storing one or more first programs, which when executed, cause the first processor to execute a first process including:
generating a public key and a secret key, each of the public key and the secret key including an issue year when a currency is issued and an issue amount in an electronic currency unit;
generating a currency issue certificate and transmitting the generated currency issue certificate to the financial institution server, the currency issue certificate configured to certify the public key including the issue year; and
adding a signature, by using the secret key including the issue year, to a currency issue message including the issue year, and transmitting the currency issue message to the financial institution server, and
the financial institution server includes:
a second processor; and
a second memory storing one or more second programs, which when executed, cause the second processor to execute a second process including:
receiving issue of the currency issue certificate from the issue bank server; and
receiving the currency issue message from the issue bank server, verifying the signature of the received currency issue message based on the currency issue certificate, generating a currency by incorporating data from the currency issue message, including the issue year, received from the issue bank server, and storing the issued currency in an unused currency storage unit.

2. The electronic currency system according to claim 1, further comprising a user terminal, wherein
the user terminal includes:
a third processor; and
a third memory storing one or more third programs, which when executed, cause the third processor to execute a third process including:
designating a face value and requesting withdrawal from the financial institution server, and
the one or more second programs, when executed, cause the second processor to further execute a fourth process including:
receiving a withdrawal request from the user terminal, cutting off currency requested to be withdrawn from the unused currency storage unit, storing the currency in an in-use currency storage unit as in-use currency to which additional currency information including a signature is added, and transmitting the in-use currency to the user terminal.

3. The electronic currency system according to claim 2, wherein the one or more second programs, when executed, cause the second processor to further execute a fifth process including:
storing used currency to which the additional currency information is added; and
storing the currency in a state before update in an updated currency storage unit in response to receiving the withdrawal request in the fourth process, updating the used currency to a currency from which the additional currency information is deleted, and storing in-use currency obtained by adding additional currency information to updated currency in the in-use currency storage unit.

4. The electronic currency system according to claim 3, wherein
the fourth process includes generating a Hash tree of currency, and signing a root of the generated Hash tree to collectively sign the currency to be withdrawn.

5. The electronic currency system according to claim 2, wherein
the fourth process includes generating a Hash tree of currency, and signing a root of the generated Hash tree to collectively sign the currency to be withdrawn.

6. The electronic currency system according to claim 2, wherein
either or both of the first processor and the second processor, and the third processor are a single and identical processor, and
either or both of the first memory and the second memory, and the third memory are a single and identical memory.

7. The electronic currency system according to claim 2, wherein
either or both of the first processor and the second processor, and the third processor are a single and identical processor, or
either or both of the first memory and the second memory, and the third memory are a single and identical memory.

8. The electronic currency system according to claim 1, wherein
the first processor and the second processor are a single and identical processor, and
the first memory and the second memory are a single and identical memory.

9. The electronic currency system according to claim 1, wherein the first processor and the second processor are a single and identical processor, or the first memory and the second memory are a single and identical memory.

10. An information processing apparatus, comprising:

a processor; and a memory storing one or more programs, which when executed, cause the processor to execute a process including:

generating a public key and a secret key, each of the public key and the secret key including an issue year when a currency is issued and an issue amount in an electronic currency unit;

generating a currency issue certificate configured to certify the public key including the issue year, and transmitting the generated currency issue certificate to a financial institution server communicably connected to the information processing apparatus via a network; and adding a signature, by using the secret key including the issue year, to a currency issue message including the issue year, and transmitting the currency issue message to the financial institution server.

11. A non-transitory storage medium storing a program for causing a computer to execute the process of the information processing apparatus according to claim 10.

12. An electronic currency issuing method executed by an electronic currency system including an issue bank server and a financial institution server communicably connected with each other via a network, wherein the issue bank server executes generating a public key and a secret key, each of the public key and the secret key including an issue year when a currency is issued and an issue amount in an electronic currency unit, generating a currency issue certificate and transmitting the generated currency issue certificate to the financial institution server, the currency issue certificate configured to certify the public key including the issue year, and adding a signature, by using the secret key including the issue year, to a currency issue message including the issue year, and transmitting the currency issue message to the financial institution server, and the financial institution server executes receiving issue of the currency issue certificate from the issue bank server, and receiving the currency issue message from the issue bank server, verifying the signature of the received currency issue message based on the currency issue certificate, generating a currency by incorporating data from the currency issue message, including the issue year, received from the issue bank server, and storing the issued currency in an unused currency storage unit.

\* \* \* \* \*